US012498935B2

(12) United States Patent
Sivathanu et al.

(10) Patent No.: US 12,498,935 B2
(45) Date of Patent: Dec. 16, 2025

(54) ELASTICALLY MANAGING WORKERS OF MULTI-WORKER WORKLOADS ON ACCELERATOR DEVICES

(71) Applicant: Microsoft Technology Licensing, LLC, Redmond, WA (US)

(72) Inventors: Muthian Sivathanu, Chennai (IN); Srinidhi Viswanatha, Bangalore (IN); Bhargav Gulavani, Bengaluru (IN); Dharma Kiritkumar Shukla, Bellevue, WA (US); Rimma Vladimirovna Nehme, Bellevue, WA (US); Amey Agrawal, Bangalore (IN); Ramachandran Ramjee, Bengaluru (IN); Kaustubh Welankar, Bangalore (IN); Ravi Shreyas Anupindi, Bengaluru (IN)

(73) Assignee: Microsoft Technology Licensing, LLC., Redmond, WA (US)

( * ) Notice: Subject to any disclaimer, the term of this patent is extended or adjusted under 35 U.S.C. 154(b) by 685 days.

(21) Appl. No.: 17/855,722

(22) Filed: Jun. 30, 2022

(65) Prior Publication Data
US 2023/0236837 A1    Jul. 27, 2023

(30) Foreign Application Priority Data
Jan. 25, 2022   (IN) .............................. 202241004149

(51) Int. Cl.
*G06F 9/46* (2006.01)
*G06F 9/38* (2018.01)
(Continued)

(52) U.S. Cl.
CPC ............ *G06F 9/3893* (2013.01); *G06F 9/461* (2013.01); *G06F 9/4881* (2013.01);
(Continued)

(58) Field of Classification Search
CPC ...... G06F 9/3893; G06F 9/461; G06F 9/4881; G06F 9/5016; G06F 9/522; G06F 11/1004; G06F 11/1407
(Continued)

(56) References Cited

U.S. PATENT DOCUMENTS 5,873,120 A * 2/1999 Harvey ................. G06F 9/5016
                                                711/212
10,275,851 B1   4/2019 Zhao et al.
(Continued)

OTHER PUBLICATIONS

Bai, Z., Zhang, Z., Zhu, Y., & Jin, X. (2020). {PipeSwitch}: Fast pipelined context switching for deep learning applications. In 14th USENIX Symposium on Operating Systems Design and Implementation (OSDI 20) (pp. 499-514). (Year: 2020).*
(Continued)

*Primary Examiner* — Hiren P Patel
*Assistant Examiner* — Justin Che-Chun Tong
(74) *Attorney, Agent, or Firm* — Barta Jones, PLLC

(57) ABSTRACT

The disclosure herein describes elastically managing the execution of workers of multi-worker workloads on accelerator devices. A first worker of a workload is executed on an accelerator device during a first time interval. A first context switch point is identified when the first worker is in a first worker state. At the identified context switch point, a first memory state of the first worker is stored in a host memory and the accelerator device is configured to a second memory state of the second worker. The second worker is executed during a second time interval and a second context switch point is identified at the end of the second time interval when the second worker is in a state that is equivalent to the first worker state. During the intervals, collective communication operations between the workers are accumulated and, at the second context switch point, the accumulated operations are performed.

20 Claims, 10 Drawing Sheets

(51) Int. Cl.
 G06F 9/48  (2006.01)
 G06F 9/50  (2006.01)
 G06F 9/52  (2006.01)
 G06F 11/10  (2006.01)
 G06F 11/14  (2006.01)

(52) U.S. Cl.
 CPC ............ *G06F 9/5016* (2013.01); *G06F 9/522* (2013.01); *G06F 11/1004* (2013.01); *G06F 11/1407* (2013.01)

(58) Field of Classification Search
 USPC .................................................. 718/107, 108
 See application file for complete search history.

(56) References Cited

U.S. PATENT DOCUMENTS

| | | | |
|---|---|---|---|
| 11,086,713 B1* | 8/2021 | Sapuntzakis | G06F 3/0673 |
| 2017/0116132 A1 | 4/2017 | Mealey et al. | |
| 2019/0004839 A1 | 1/2019 | Cheng et al. | |
| 2019/0324856 A1* | 10/2019 | Zhao | G06F 18/2148 |
| 2022/0214902 A1* | 7/2022 | Zhao | G06F 9/4856 |
| 2022/0414817 A1* | 12/2022 | Zad Tootaghaj | G06F 9/4881 |
| 2023/0153174 A1* | 5/2023 | Thyagaturu | G06F 9/5083 |
| | | | 718/105 |

OTHER PUBLICATIONS

"Akka", Retrieved from: https://web.archive.org/web/20210413062408/https://akka.io/, Apr. 13, 2021, 4 Pages.

"Checkpoint/Restore in User Space", Retrieved from: https://web.archive.org/web/20210326043234/https://criu.org/Main_Page, Mar. 26, 2021, 3 Pages.

"GRPC, A High-Performance, Open-source Universal RPC Framework.", Retrieved from: https://web.archive.org/web/20210416144134/https://grpc.io/, Apr. 16, 2021, 2 Pages.

"Hadoop: Fair Scheduler", Retrieved from: https://hadoop.apache.org/docs/r2.7.4/hadoop-yarn/hadoop-yarn-site/FairScheduler.html, Jul. 29, 2017, 7 Pages.

"The Scala Programming Language", Retrieved from: https://www.scala-lang.org/, Apr. 18, 2021, 13 Pages.

Ausubel, et al., "The Lovely but Lonely Vickrey Auction", In Book Combinatorial Auctions, vol. 17, Jan. 2006, 37 Pages.

Boag, et al., "Scalable Multi-Framework Multi-Tenant Lifecycle Management of Deep Learning Training Jobs", In Proceedings of 31st Conference on Neural Information Processing Systems, Dec. 4, 2017, pp. 1-8.

Burns, et al., "Borg, Omega, and Kubernetes", In Proceedings of ACM Queue, vol. 14, Jan. 2016, pp. 70-93.

Chandra, et al., "Hierarchical Scheduling for Symmetric Multiprocessors", In Journal of IEEE Transactions on Parallel and Distributed Systems, vol. 19, Issue 3, Mar. 2008, pp. 418-431.

Cho, et al., "On the Properties of Neural Machine Translation: Encoder-Decoder Approaches", In Repository of arXiv:1409.1259v1, Sep. 3, 2014, 9 Pages.

Feitelson, et al., "Utilization and Predictability in Scheduling the IBM SP2 with Backfilling", In Proceedings of the First Merged International Parallel Processing Symposium and Symposium on Parallel and Distributed Processing, Mar. 30, 1998, pp. 542-546.

Ghodsi, et al., "Choosy: Max-Min Fair Sharing for Datacenter Jobs with Constraints", In Proceedings of the 8th ACM European Conference on Computer Systems, Apr. 15, 2013, pp. 365-378.

Ghodsi, et al., "Dominant Resource Fairness: Fair Allocation of Multiple Resource Types", In Proceedings of 8th USENIX Conference on Networked Systems Design and Implementation, Mar. 30, 2011, pp. 1-14.

Gog, et al., "Firmament: Fast, Centralized Cluster Scheduling at Scale", In 12th USENIX Symposium on Operating Systems Design and Implementation, Nov. 2, 2016, pp. 99-115.

Grandl, et al., "GRAPHENE: Packing and Dependency-Aware Scheduling for Data-parallel Clusters", In Proceedings of 12th USENIX Symposium on Operating Systems Design and Implementation, Nov. 2, 2016, pp. 81-97.

Grandl, et al., "Multi-Resource Packing for Cluster Schedulers", In Proceedings of the ACM SIGCOMM Computer Communication Review, vol. 44, Issue 4, Aug. 17, 2014, pp. 455-466.

Gu, et al., "Tiresias: A GPU Cluster Manager for Distributed Deep Learning", In Proceedings of 16th USENIX Symposium on Networked Systems Design and Implementation, Feb. 26, 2019, pp. 485-500.

He, et al., "Deep Residual Learning for Image Recognition", In Proceedings of the IEEE Conference on Computer Vision and Pattern Recognition, Jun. 27, 2016, pp. 770-778.

Hindman, et al., "Mesos: A Platform for Fine-Grained Resource Sharing in the Data Center", In Proceedings of 8th USENIX Conference on Networked Systems Design and Implementation, vol. 11, Mar. 30, 2011, pp. 1-14.

Isard, et al., "Dryad: Distributed Data-Parallel Programs from Sequential Building Blocks", In Proceedings of the 2nd ACM SIGOPS/EuroSys European Conference on Computer Systems, Mar. 21, 2007, pp. 59-72.

Isard, et al., "Quincy: Fair Scheduling for Distributed Computing Clusters", In Proceedings of the ACM SIGOPS 22nd Symposium on Operating Systems Principles, Oct. 11, 2009, pp. 261-276.

Jeon, et al., "Analysis of Large-Scale Multi-Tenant GPU Clusters for DNN Training Workloads", In Proceedings of USENIX Annual Technical Conference, Jul. 10, 2019, pp. 947-960.

Jeon, et al., "Multi-Tenant GPU Clusters for Deep Learning Workloads: Analysis and Implications", In Microsoft Research Technical Report (MSR-TR-2018-13), May 2018, 14 Pages.

Kingma, et al., "Stochastic Gradient VB and the Variational Auto-Encoder", In Proceedings of the International Conference on Learning Representations, Apr. 14, 2014, 14 Pages.

Krizhevsky, et al., "CIFAR-10 (Canadian Institute for Advanced Research)", Retrieved from: https://web.archive.org/web/20210125051132/https://academictorrents.com/details/463ba7ec7f37ed414c12fbb71ebf6431eada2d7a, Jan. 25, 2021, 2 Pages.

Li, et al., "Massively Parallel Hyperparameter Tuning", In Repository of arXiv:1810.05934v3, Nov. 29, 2018, 15 Pages.

Martin, et al., "A Database of Human Segmented Natural Images and its Application to Evaluating Segmentation Algorithms and Measuring Ecological Statistics", In Proceedings of the Eighth International Conference on Computer Vision, vol. 2, Jul. 7, 2001, pp. 416-423.

Merkel, Dirk, "Docker: Lightweight Linux Containers for Consistent Development and Deployment", Linux Journal, vol. 239, Mar. 1, 2014, 5 Pages.

Myers, et al., "How to Mount Blob Storage as a File System with Blobfuse", Retrieved from: http://web.archive.org/web/20210308132745/https://docs.microsoft.com/bs-latn-ba/azure/storage/blobs/storage-how-to-mount-container-linux, Feb. 1, 2019, 7 Pages.

Nisan, et al., "Algorithmic Game Theory", In Publication of Cambridge University Press, Sep. 24, 2007, 775 Pages.

Peng, et al., "Optimus: An Efficient Dynamic Resource Scheduler for Deep Learning Clusters", In Proceedings of the Thirteenth EuroSys Conference Pattern Recognition, Apr. 23, 2018, 14 Pages.

Picus, et al., "Word-Level Language Modeling RNN", Retrieved from: https://github.com/pytorch/examples/tree/master/word_language_model, Jul. 7, 2020, 3 Pages.

Popa, et al., "FairCloud: Sharing the Network in Cloud Computing", In Proceedings of the ACM SIGCOMM Conference on Applications, Technologies, Architectures, and Protocols for Computer Communication, Aug. 13, 2012, pp. 187-198.

Radford, et al., "Unsupervised Representation Learning with Deep Convolutional Generative Adversarial Networks", In Repository of arXiv:1511.06434v1, Nov. 19, 2015, 15 Pages.

Sergeev, et al., "Horovod: Fast and Easy Distributed Deep Learning in TensorFlow", In Repository of arXiv:1802.05799v3, Feb. 21, 2018, 10 Pages.

Shi, et al., "Real-Time Single Image and Video Super-Resolution using an Efficient Subpixel Convolutional Neural Network", In

(56) References Cited

OTHER PUBLICATIONS

Proceedings of the IEEE Conference on Computer Vision and Pattern Recognition, Jun. 2016, pp. 1874-1883.
Vavilapalli, et al., "Apache Hadoop YARN: Yet Another Resource Negotiator", In Proceedings of the 4th Annual Symposium on Cloud Computing, Oct. 1, 2013, 16 Pages.
Waldspurger, Carl A., "Lottery and Stride Scheduling: Flexible Proportional-Share Resource Management", In Doctoral Dissertation, Massachusetts Institute of Technology, Sep. 1995, 151 Pages.
Waldspurger, et al., "Lottery Scheduling: Flexible Proportional-Share Resource Management", In Proceedings of the 1st USENIX Conference on Operating Systems Design and Implementation, Nov. 14, 1994, 11 Pages.
Xiao, et al., "Gandiva: Introspective Cluster Scheduling for Deep Learning", In Proceedings of 13th USENIX Symposium on Operating Systems Design and Implementation, Oct. 8, 2018, pp. 595-610.
Xie, et al., "Aggregated Residual Transformations for Deep Neural Networks", In Proceedings of IEEE Conference on Computer Vision and Pattern Recognition, Jul. 2017, pp. 1492-1500.
You, et al., "Large Batch Optimization for Deep Learning: Training BERT in 76 Minutes", In Proceedings of 8th International Conference on Learning Representations, Apr. 26, 2020, pp. 1-37.
Yu, et al., "DryadLINQ: A System for General-Purpose Distributed Data-Parallel Computing Using a High-Level Language", In Proceedings of the 8th USENIX Conference on Operating Systems Design and Implementation, vol. 8, Dec. 8, 2008, pp. 1-14.
Chaudhary., Balancing Efficiency and Fairness in Heterogeneous GPU Clusters for Deep Learning, In Proceedings of the Fifteenth European Conference on Computer System, Apr. 27, 2020, 16 Pages.
Lecun, et al., "The Mnist Database of Handwritten Digits", Retrieved from: http://yann.lecun.com/exdb/mnist/, Apr. 17, 2021, 7 Pages.
"International Search Report and Written Opinion Issued in PCT Application No. PCT/US22/019214", Mailed Date Jun. 8, 2022, 9 Pages.
"International Search Report and Written Opinion Issued in PCT Application No. PCT/US23/010160", Mailed Date: Mar. 24, 2023, 12 Pages.

\* cited by examiner

ELASTICALLY MANAGING WORKERS OF MULTI-WORKER WORKLOADS ON ACCELERATOR DEVICES

CROSS-REFERENCE TO RELATED APPLICATIONS

This application claims the benefit of India provisional application number 202241004149 filed on Jan. 25, 2022 and entitled "Transparent Elasticity for Planet-Scale Computer", which is hereby incorporated by reference in its entirety for all intents and purposes.

BACKGROUND

Cloud infrastructure includes hardware accelerators, computer networking and storage—all of which are bundled together in a workload-aware manner. Artificial Intelligence (AI) workloads (e.g., model training such as Deep Learning Training (DLT) and inferencing) are special in how they operate in that they are written, architected, and executed in a specific manner. Currently, general-purpose cloud-based Infrastructure as a Service (IaaS) is used for DLT and inferencing jobs, which require data scientists to design AI DLT problems, execute them, and solve any resultant problems that may occur from today's IaaS. This has resulted in multiple trends. DLT workloads are growing exponentially (e.g., 10× per year). As a result, the industry is responding to this uptick in DLT workloads by including more hardware in the IaaS environments (e.g., providing more graphics processing units (GPUs) or other hardware accelerators, adding more nodes, and building out more distributed clusters). Yet, as the models continue to grow exponentially, it becomes untenable to grow IaaS systems in such an exponential manner. There are limits to the size and flexibility of cloud infrastructures, including limits associated with how efficiently such workloads can be managed and distributed across available hardware.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for elastically managing the execution of workers of multi-worker workloads on accelerator devices is described. A first worker of a multi-worker workload is executed on an accelerator device during a first time interval. A first context switch point is identified, at which point the first worker is in a first worker state and the accelerator device is reconfigured to execute a second worker. At the identified context switch point, a first memory state of the accelerator device associated with the first worker in the first worker state is stored in a host device memory and the memory of the accelerator device is configured to a second memory state associated with the second worker. The second worker is executed on the accelerator device using the configured memory during a second time interval and a second context switch point is identified at the end of the second time interval at which point the second worker is in a second worker state that is equivalent to the first worker state and the accelerator device is reconfigured to execute the first worker. During the first and second time intervals, collective communication operations between the first worker and the second worker are accumulated and, at the second context switch point, the accumulated collective communication operations are performed.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Figure 1:
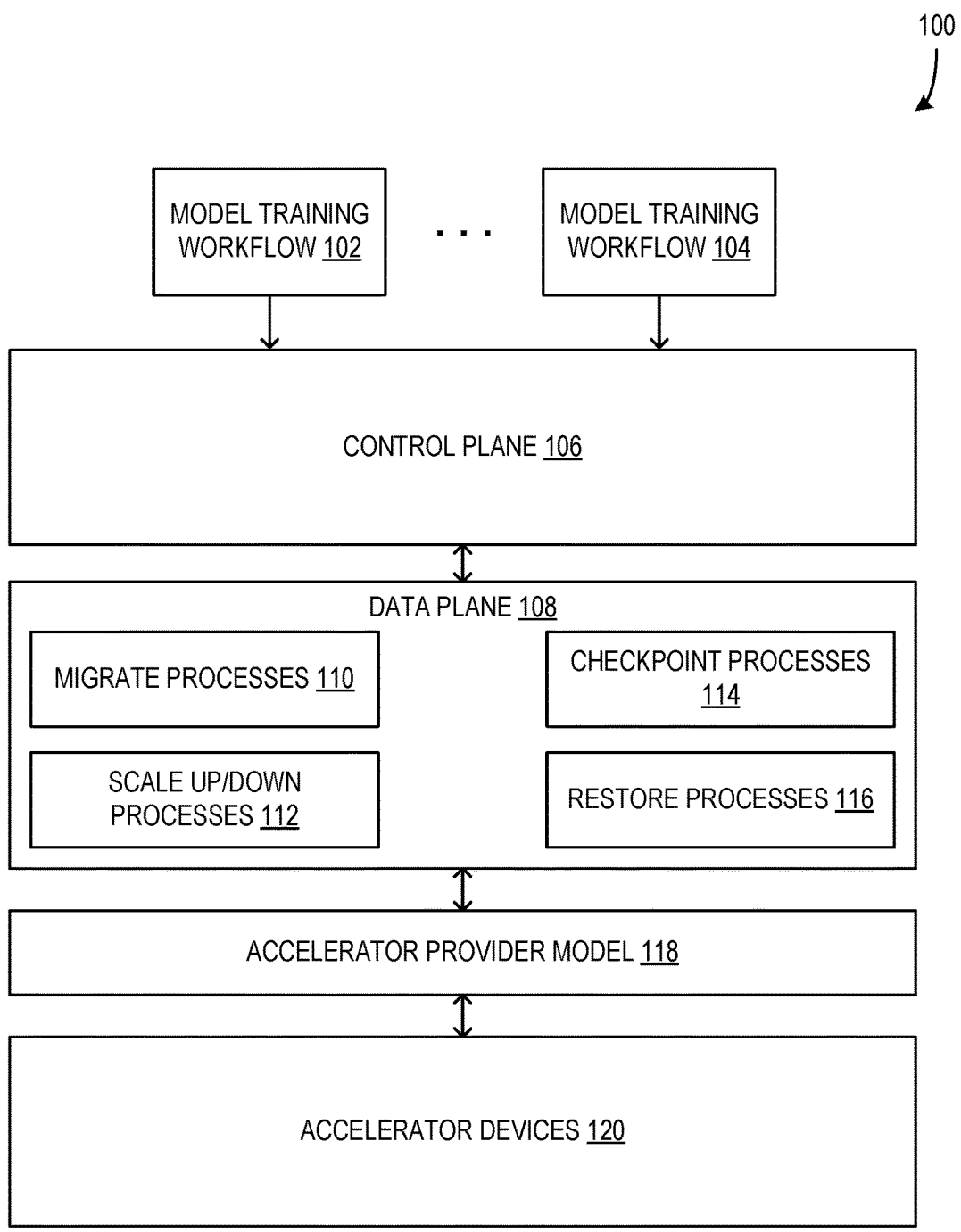
FIG. 1 is a block diagram illustrating a system configured to manage and execute model training workflows on accelerator devices.

Aspects of the disclosure provide a computerized method and system for managing the execution of artificial intelligence (AI) workloads, such as training and inferencing workloads, using a diverse, distributed pool of infrastructure resources. Distributed infrastructure resources (first-party and third-party) are integrated into the cloud infrastructure platform via native support interfaces, enabling many entities to make use of their own infrastructure to add to the global pool of resources. AI workloads are received from a plurality of tenants and resource subsets of the set of distributed infrastructure resources are assigned to the received AI workloads, including securing the AI workloads from each other using containers to enable multiple AI workloads to be executed securely on the same server. The received AI workloads are scheduled for execution on the assigned resource subsets and based on the scheduling of the AI workloads, they are then executed on the assigned resource subsets.

The disclosure enables the elastic management of the execution of such workloads on accelerator device infrastructure that changes dynamically during execution, including scaling down a workload (e.g., moving workers of the workload from one quantity of accelerator devices to a smaller quantity of accelerator devices) and/or scaling up a workload (e.g., moving workers of the workload from one quantity of accelerator devices to a larger quantity of accelerator devices). The disclosure operates in an unconventional manner at least by placing a device proxy interface between host devices and accelerator devices that is configured to decouple the address spaces of a host device and an accelerator device from each other, enabling more flexible management of accelerator devices without affecting the address space of the associated host devices. In some examples, the device proxy interface is configured to intercept instructions between the host device and accelerator device and translate address references associated with the host device address space into address references associated with the accelerator device address space, such that operations associated with the intercepted instructions can be performed with the translated address references in the accelerator device address space. This abstraction layer between the two address spaces enables the disclosure to make worker processes of all workloads elastic, preemptible and/or migratable, even if they are not specifically configured for such activity.

Further, the disclosure operates in an unconventional manner by enabling the execution of multiple worker processes on a single accelerator device without affecting the operations of the host devices from which the worker processes originate. In some examples, the device proxy of the disclosure is configured to execute a first worker and a second worker of a multi-worker workload on a single accelerator device. The first worker is executed during a first time interval and the second worker is executed during a second time interval that takes place after the first time interval. The context switch point between the first and second time intervals includes storing the memory state associated with the first worker in host device memory and reconfiguring the memory of the accelerator device to a memory state of the second worker. Further, collective communication operations between the first and second worker are accumulated during the first and second time intervals and then the accumulated operations are performed after the second interval is complete. In such examples, after the second worker is executed during the second interval, the first and second workers are in equivalent states, enabling another context switch back to the first worker. Because the address spaces of the host devices of the workers are decoupled from the address space of the accelerator device, the host devices remain unaffected by the context switching (e.g., it appears to the host devices that each of the workers are executing on separate accelerator devices).

Additionally, or alternatively, in some examples, the disclosure is configured to address the computing resource costs associated with context switching between workers on an accelerator device. The disclosed device proxy is configured to generate checksums for memory buffers that are to be swapped between accelerator device memory and host device memory and/or vice versa during the context switching process. Those checksums are compared to checksums of memory buffers that are currently present in the destination memory and, if matching checksums are found, then the associated memory buffers to be swapped are already present and do not need to be moved again. Many of the workloads being executed, such as the model training workloads described herein, include multiple workers that have and use redundant memory buffers between them, so many of the buffer writing tasks, which consume computing resources, can be avoided by using the described checksum comparison techniques, which saves significant computing resource usage and time during context switching.

Further, in some examples, the disclosure is configured to address inefficiencies caused by different workers of a workload using different addresses for equivalent data buffers. The disclosed device proxy is configured to take advantage of semantic patterns of use of data buffers during the execution of multi-worker workloads such as model training workloads. "Stable buffers", which are memory buffers that tend to be the same for all workers of a workload when the workers are in the same state, are identified and stored at one extreme of the address space (e.g., starting with the highest address value and moving toward lower address values) while all other buffers are stored at the other extreme of the address space (e.g., starting with the lowest address value and moving toward higher address values). In this way, the stable buffers can easily be shared amongst workers of a workload without requiring the address references to be synchronized between workers that have stored their stable buffers in different locations.

Additionally, in some examples, the disclosure enhances the performance and flexibility of computing systems/clusters as described herein by enabling multi-worker workloads to be performed on smaller quantities of accelerator devices. For instance, in other systems, if a cluster has only two accelerator devices that are free and a workload with eight workers arrives, those two accelerator devices will remain idle, and the workload will wait in the queue until eight accelerator devices become free in the cluster. However, the disclosure enables the workload to be resized to fit on the two free accelerator devices, thereby allowing the workload to make progress instead of waiting in the queue, while also improving the efficiency of the cluster by avoiding idle time of the two accelerator devices.

FIG. 1 is a block diagram illustrating a system 100 configured to manage and execute model training workflows 102-104 on accelerator devices 120. In some examples, the system 100 includes a service that is built to manage all AI accelerator devices 120 under one fleet, providing fungible scheduling of both training and inference workloads across multiple types of accelerators, such as Graphics Processing Units (GPUs) and/or Application Specific Integrated Circuits (ASICs). The disclosure focuses on the reliability subsystems of this service, including the migrate processes 110, the checkpoint processes 114, the scale up/down processes 112, and the restore processes 116, which are the core building blocks of higher-level features of the described service.

The system 100 includes a control plane 106 through which the model training workflows 102-104 use the described service. The data plane 108 is configured to enable the management the location and/or management of worker processes that are using the accelerator devices 120 through the use of migrate or migration processes 110, checkpoint processes 114 and restore processes 116, and/or scale up/down processes 112, as described herein. The accelerator provider model 118 provides an interface between the data plane 108 and the physical accelerator devices 120 that are being used to execute the worker processes of the model training workflows 102-104.

Figure 2:
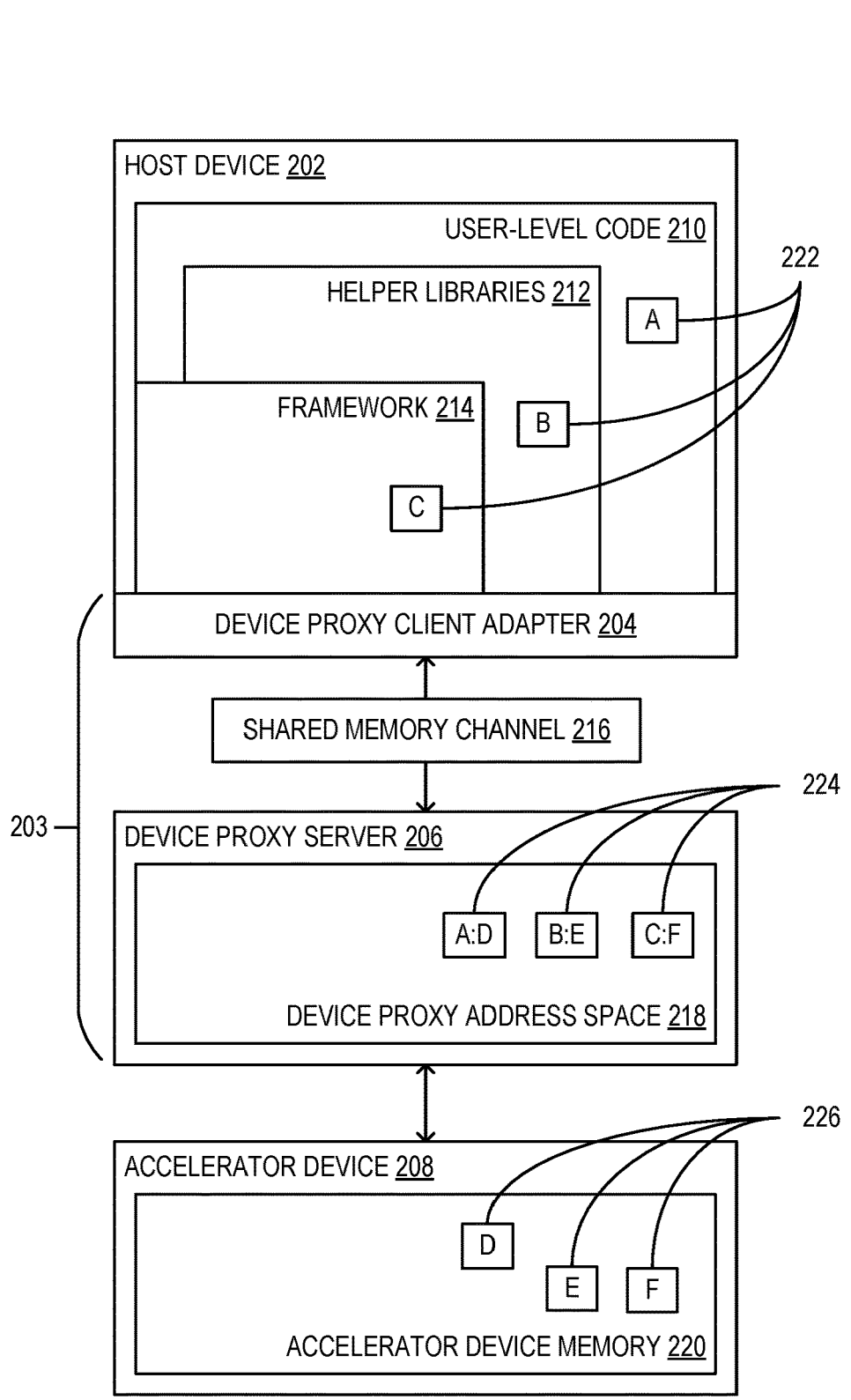
FIG. 2 is a block diagram illustrating a system including a device proxy configured to facilitate the use of an accelerator device by workloads of a host device.

FIG. 2 is a block diagram illustrating a system 200 including a device proxy 203 (e.g., a device proxy client adapter 204 and a device proxy server 206) configured to facilitate the use of an accelerator device 208 by workloads of a host device 202. In some examples, the device proxy client adapter 204 is configured to intercept commands, messages, and/or other interactions from processes of the host device 202 and to share the intercepted interactions with the device proxy server 206 via a shared memory channel 216.

The device proxy server 206 is configured to interact with the accelerator device 208 based on the intercepted interactions received from the device proxy client adapter 204, including acting as an interface between references to address locations of the address space of the host device 202 and references to address locations in the address space of the accelerator device memory 220 of the accelerator device 208. The device proxy server 206 is configured to maintain a separate address space from the address space of the host device 202, such that address references in the address space of the host device 202 are decoupled from address references in the address space of the accelerator device 208. This decoupled structure enables the transparent migration of workloads and transparent elasticity of accelerator device use as described herein with respect to at least FIGS. 3, 4A-B, and 5A-B.

As illustrated, an address space of the host device 202 includes address space for user-level code 210, address space for helper libraries 212, and address space for the framework 214. Each of these address spaces includes a highlighted address reference 222 (references A, B, and C) that is associated with interactions with the accelerator device 208. Upon intercepting interactions that include those references 222, the device proxy server 206 is configured to map the address references 222 associated with the host device 202 address space into address references 226 associated with the accelerator device 208 address space using the address mappings 224 in the device proxy address space 218 of the device proxy server 206. For instance, reference A is mapped to reference D, reference B is mapped to reference E, and reference C is mapped to reference F as illustrated in the address mappings 224. This demonstrates the interface functionality provided by the device proxy 203. In situations where the accelerator device 208 being used for a worker running on the host device 202 changes, the device proxy server 206 is configured to update the mapping 224, while the references 222 of the host device 202 can remain unchanged, thereby not interfering with the execution of the worker and associated processes on the host device 202. The described systems are configured to dynamically and transparently adjust how accelerator devices 208 are being used by workloads without interfering or otherwise affecting processes running in host device 202 address spaces, enabling elastic use of the accelerator device 208 resources of a system in an efficient manner.

Transparent elasticity allows the system 200 using the device proxy 203 to dynamically scale any distributed, multi-worker process workload, such as a Deep Neural Network (DNN) training workload and/or job, up or down to use a varying number of accelerator devices 208, such as GPUs, without affecting the semantics of the workload and without requiring any changes to user-level code 210. Resizing the workload using the device proxy 203 is done transparently: to a user at the host device 202 level, the workload is always executing or running with the same world size (i.e., number of ranks/worker processes, or workers). A scheduler of the device proxy 203 is configured to use a one-to-one mapping of each worker to a separate physical accelerator device 208 (e.g., the workload is fully "scaled-up") or have a many-to-one mapping of multiple workers to a single accelerator device 208, where a physical accelerator device 208 is virtualized and time-sliced across multiple workers (e.g., the workload is "scaled-down").

An important property of the transparent fungibility in systems using device proxies 203 as described herein is that a migrated or resized workload resumes at the same program execution point with the same state (e.g., state of the program counter, state of the stack, or the like) as the moment when it was preempted or resized. In contrast, in systems that rely on user/library-driven migration and elasticity, a workload is restarted from a last or most recent checkpoint (e.g., a previously completed epoch in a model training workload), thus increasing the cost of provided fungibility due to redoing at least some of the associated computation. With the systems and methods described herein, the cost of migrating or resizing is substantially reduced (a few seconds, in some examples) as a new workload resumes at the same program state in which the original workload was halted, thus empowering a scheduler of the system to absorb even small periods of resource availability. Hence, the transparent approach using the device proxy 203 as described herein is conserves more work and/or effort for all types of workloads.

Figure 3:
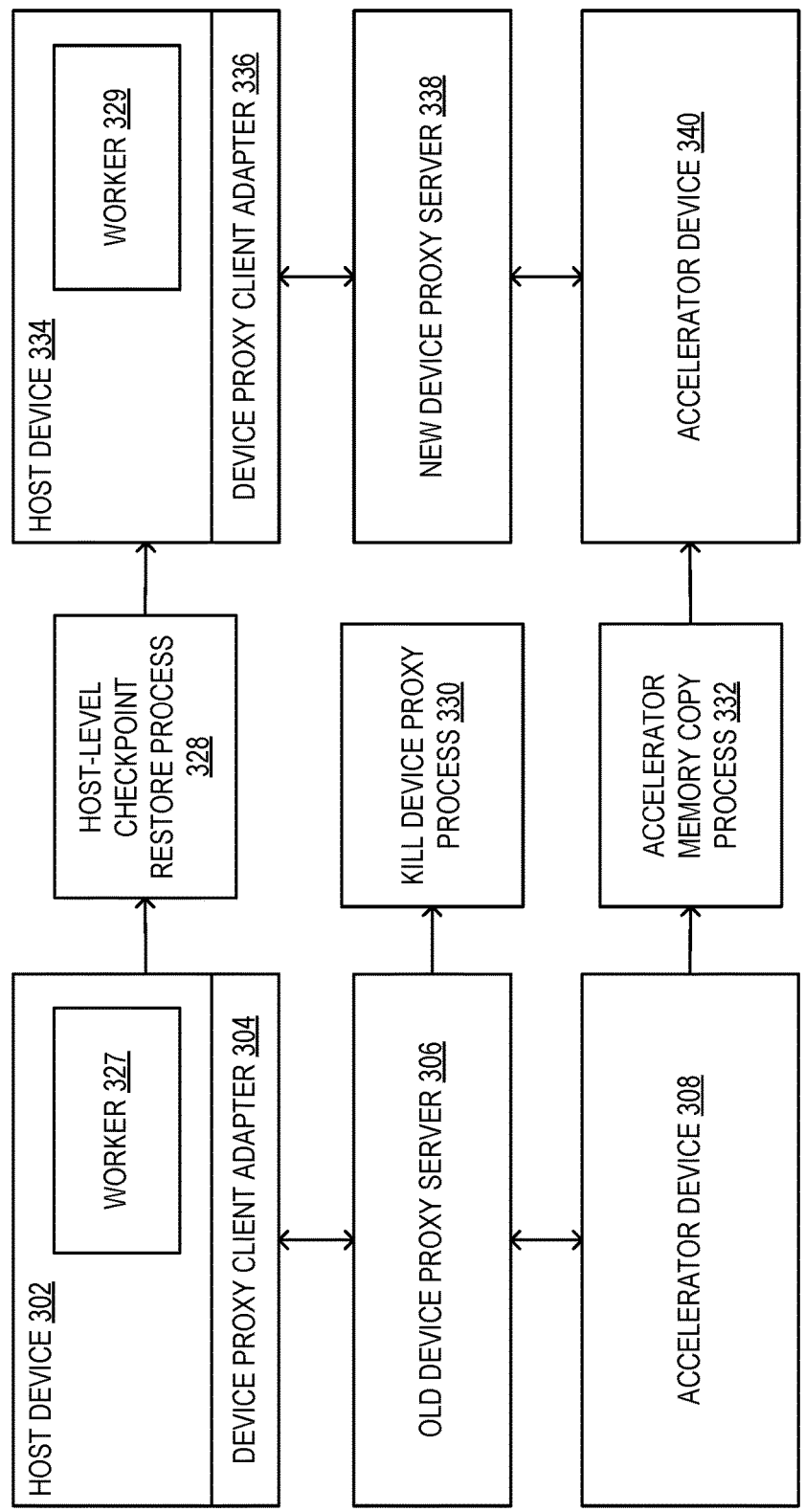
FIG. 3 is a block diagram illustrating a system configured for transparent migration of workers between host devices and accelerator devices using a device proxy.

FIG. 3 is a block diagram illustrating a system 300 configured for transparent migration of workers (e.g., worker 327) between host devices (e.g., host devices 302 and 334) and accelerator devices (e.g., accelerator devices 308 and 340) using a device proxy 306. In some examples, the system 300 is part of or otherwise associated with a system such as system 200 of FIG. 2 as described above.

The host device 302 includes a worker 327 process that is being executed as part of a multi-user workload and that uses the accelerator device 308 during its execution. Calls by the worker 327 to the accelerator device 308 are intercepted by the device proxy client adapter 304 and then processed by the old device proxy server 306, as described above with respect to FIG. 2. Further, the system 300 is configured to migrate the worker 327 and/or other processes executing on the host device 302 to another host device 334 and another accelerator device 340.

In some examples, the system 300 is configured to enable transparent checkpointing of the worker 327 and/or other similar processes, such as generic DNN workloads. First, the system 300 is configured to facilitate a consistent point at which checkpoints occur for workers across multiple hosts and/or accelerator devices. For instance, all workers are managed such that they are in safe and consistent states with respect to collective communications (e.g., allreduce operations). Second, the system 300 is configured to maintain consistent states between the Central Processing Units (CPUs) of host devices and the GPUs of accelerator devices, such that those states are consistently restored on the destination devices of the migration. Third, the system 300 is configured to reduce and/or maintain low levels of storage space overhead for large, distributed workloads with hundreds of worker processes.

Further, the system 300 is configured to enable the checkpointing of the address space of the host device 302. In some examples, the system 300 is configured to use a host-level checkpoint restore process 328, such as a Checkpoint/Restore in Userspace (CRIU) tool, for migrating the address space state of the host device 302 to the host device 334 (e.g., migrating the state of the worker 327 process to the worker 329 process). However, in examples where such tools do not handle device mappings associated with accelerator devices that are being used, the system 300 uses the separate address space of the device proxy server 306 and accelerator device 308 to isolate the address space of the host device 302, such that mappings associated with the accelerator devices are handled by the device proxy 306.

In some examples, the device proxy server 306 is configured to be substantially stateless, such that, during the migration process of the system 300, the old device proxy server 306 is killed or otherwise halted by a kill device proxy process 330 and a new device proxy server 338 is instantiated for use with the accelerator device 340 and the host device 334, as well as any other host devices that use the accelerator device 340.

Further, in some examples, the state of the accelerator device 308 is copied to the accelerator device 340 using the accelerator memory copy process 332 during the migration process. In some such examples, the device proxy 306 is configured to perform and/or facilitate the performance of the accelerator memory copy process 332 (e.g., via a device-to-host memcpy process). Because the device proxy is configured to track the portion of the memory of the accelerator device 308 that is in use, the accelerator memory copy process 332 can limit its copying to that tracked portion, significantly reducing the checkpoint size of the accelerator device 308. Further, in some examples, the accelerator memory copy process 332 is configured to use the entire GPU memory of the accelerator device 340 at startup in order to map the copied memory portion of the accelerator device 308 to the same locations in the memory of the accelerator device 340, thereby preserving the accuracy of any references to the memory of the accelerator device 308 in the checkpoint.

Additionally, or alternatively, in some examples, the system 300 is configured to provide and/or facilitate the use of other features during a migration process. For instance, the system 300 is configured to use a distributed barrier algorithm or process to ensure that the multiple workers of a workload are in sync with respect to collective communications when those workers are checkpointed. In some such examples, the barrier process includes the workers sharing state information with each other to determine when the workers switch into a synchronous mode and perform any collective communications in that mode. In other examples, other methods of synchronizing collective communication between workers are used without departing from the description.

Returning to FIG. 2, in some examples, the system 200 is configured to decouple the logic of a multi-worker workload (e.g., a DNN training workload written in PyTorch) from its interaction with the accelerator device 208. While the worker processes of the workload initiate accelerator device 208 Application Programming Interfaces (APIs), they are intercepted by the device proxy client adapter 204 and sent over the shared memory channel 216 to the device proxy server 206 which runs in a separate address space (e.g., the device proxy address space 218). Further, the device proxy server's lifetime is decoupled from the lifetime of the worker process running on the host device 202. This separation achieves at least two key benefits: (a) the host address space of the host device 202 is kept free of device-specific mappings and/or address references and other side-effects created by accelerator device 208 libraries, making it easier to checkpoint the host processes with existing checkpointing libraries, and (b) it allows the device proxy server 206 to simultaneously serve a dynamically varying set of worker processes (e.g., multiple workers or ranks), thus enabling transparent time-slicing of the processing resources of the accelerator device 208 (e.g., GPUs) across multiple workers in a scaled-down mode, where "scaled-down mode" means a mode of operation in which multiple workers are using one accelerator device 208 instead of each worker using a separate accelerator device from other workers.

In some examples, there are several challenges addressed by the system 200 with respect to transparent migration of multi-worker workloads such as generic DNN training jobs. First, at the time of checkpointing, the system 200 is configured to facilitate the consistency of distributed jobs. For instance, states of all workers of a distributed workload are managed to enable the workers to be at a safe and consistent state with respect to collective communication (e.g., workers of a distributed training workload perform an "allreduce" operation that reduces the target arrays of all workers into a single array and returns that resultant array to all workers). In some examples, the device proxy 203 is configured to perform a distributed barrier process that achieves a consistent distributed barrier in a transparent manner by intercepting the communications library, while adhering to the unique program-order constraints of collective communication APIs. Second, the in-flight state between CPU(s) of a host device 202 and GPUs of an accelerator device 208 (e.g., active handles, GPU memory addresses stored in the GPU) is managed and/or restored consistently. Third, the space overhead of checkpointing processes is reduced and/or maintained at low levels even for large workloads that have hundreds of workers, despite the challenges associated with storing per-worker program state and address space, e.g., checkpointing libraries.

Further, in some examples, the system 200 is configured address challenges associated with transparent elasticity as well. First, when time-slicing multiple workers of a multi-worker workload on the same accelerator device 208, the fine-grained communication between the workers, such as allreduce operations as described above, are managed as if the workers were running in different accelerator devices 208. To achieve this, the time-slicing operations performed by the device proxy 203 are configured to be semantics-aware as well as extremely lightweight, as context switching between workers on the accelerator device 208 may need to be performed several times during the processing of the same mini-batch, wherein a mini-batch includes a set of inputs to be processed by each worker of the multi-worker workload being executed once. Second, in some examples in which large models are trained, each worker may consume the entire random access memory (RAM) on the accelerator device 208. The device proxy 203 is configured to enable multiple workers to be executed on the same accelerator device 208 by swapping accelerator device state data back-and-forth to host memory of the host device 202. In many such examples, such swapping renders the context switches to be quite expensive, reducing end-to-end throughput by 3-10×, but the device proxy 203 is configured to address this issue through the replica-splicing methods described herein, at least with respect to FIGS. 4A-B and 5A-B. Third, to support transparent elasticity for jobs that use a combination of data-parallelism, pipeline-parallelism and model parallelism, the device proxy 203 is configured to perform careful placement of workers on accelerator devices 208 such that only data parallel replicas of the same model-parallel shard are time-sliced on the same accelerator device 208, preventing the time-slicing from introducing cyclic dependencies in the cross-rank communication. The system 200 and the device proxy 203 specifically are configured to perform the replica splicing operations, as described herein, which build on top of the transparent checkpointing support and enable time-slicing with negligible overhead for generic workloads while addressing and overcoming the challenges described above.

Elasticity enables workloads to expand to use spare capacity, and to shrink quickly when capacity becomes scarce. The combination of checkpointing and elasticity is crucial to balance tenant isolation (e.g., per Service Level Agreements (SLAs)) and sharing (e.g., for fleet-wide throughput). To provide transparent checkpointing and elasticity, the device proxy 203 exploits the narrow interface that exists between CPU execution on the host device 202 and execution on accelerator devices 208 such as GPUs. In most examples, any interaction with an accelerator device 208 uses specific libraries, which the device proxy client adapter 204 is configured to dynamically intercept (e.g., via a LD PRELOAD mechanism).

In some examples, the device proxy 203 includes hardware, firmware, and/or software configured to provide a hardware abstraction service for the accelerator device 208 and has the device proxy server 206 component (e.g., one per device), and the device proxy client adapter 204 component (e.g., in each process interacting with the accelerator device 208). All accelerator-specific APIs invoked by the host 202 are intercepted and shipped to the device-proxy server 206, which runs in an isolated address space 218. Running accelerator device 208 APIs in a separate address space helps in at least two ways: (a) it keeps the host address space of the host device 202 clean of device mappings and other references that may break checkpointing tools and (b) it allows the device proxy server 206 to be efficiently shared across multiple host processes (e.g., of multiple host devices 202) during time-slicing for elasticity. Note that the communication between a host process and the device-proxy server 206 is in the critical path of dispatch to accelerator device 208 and to make it low-latency the system 200 uses lock-free shared memory channels 216 with spin-waiting, so that there is no overhead per function call/operation.

There are two types of interceptors in the device-proxy 203, in some examples: Dispatch Interceptors (DInt) and Semantics-Aware Interceptors (SAInt). A DInt is semantics-oblivious, and serves (e.g., only) the purpose of bridging the API cross-address-space to the device-proxy server 206 and handling the serialization/deserialization of parameters and response. A SAInt, on the other hand, incorporates custom logic either at the client side (e.g., the device proxy client adapter 204) or server side (e.g., the device proxy server 206) (referred to as client SAInt or server SAInt respectively), to perform functionality such as barrier operations, time-slicing, memory management, or the like. Additionally, or alternatively, the device proxy 203 has an automated code generator that generates the client and server stubs for all DInts. It uses a list of header files that are provided by the specific accelerator library, with some annotations that are made manually (e.g., to indicate state-changing calls). Most of the interceptors (e.g., about 95%) are DInts, and hence the incremental cost of supporting a new library version or new hardware remains manageable. Note that DInt and SAInt are not mutually exclusive. For example, the same API may simultaneously have a client SAInt, a DInt for cross-address-space, and a server SAInt.

APIs require a SAInt to handle transparent elasticity. The time-slicing performed by the device proxy 203 is configured to be semantics-aware so that communication across time-sliced workers is correctly managed. The synchronization APIs of the device proxy 203 (e.g., a StreamWaitEvent API) control when time-slicing is essential for correctness and liveness.

Figure 4A:
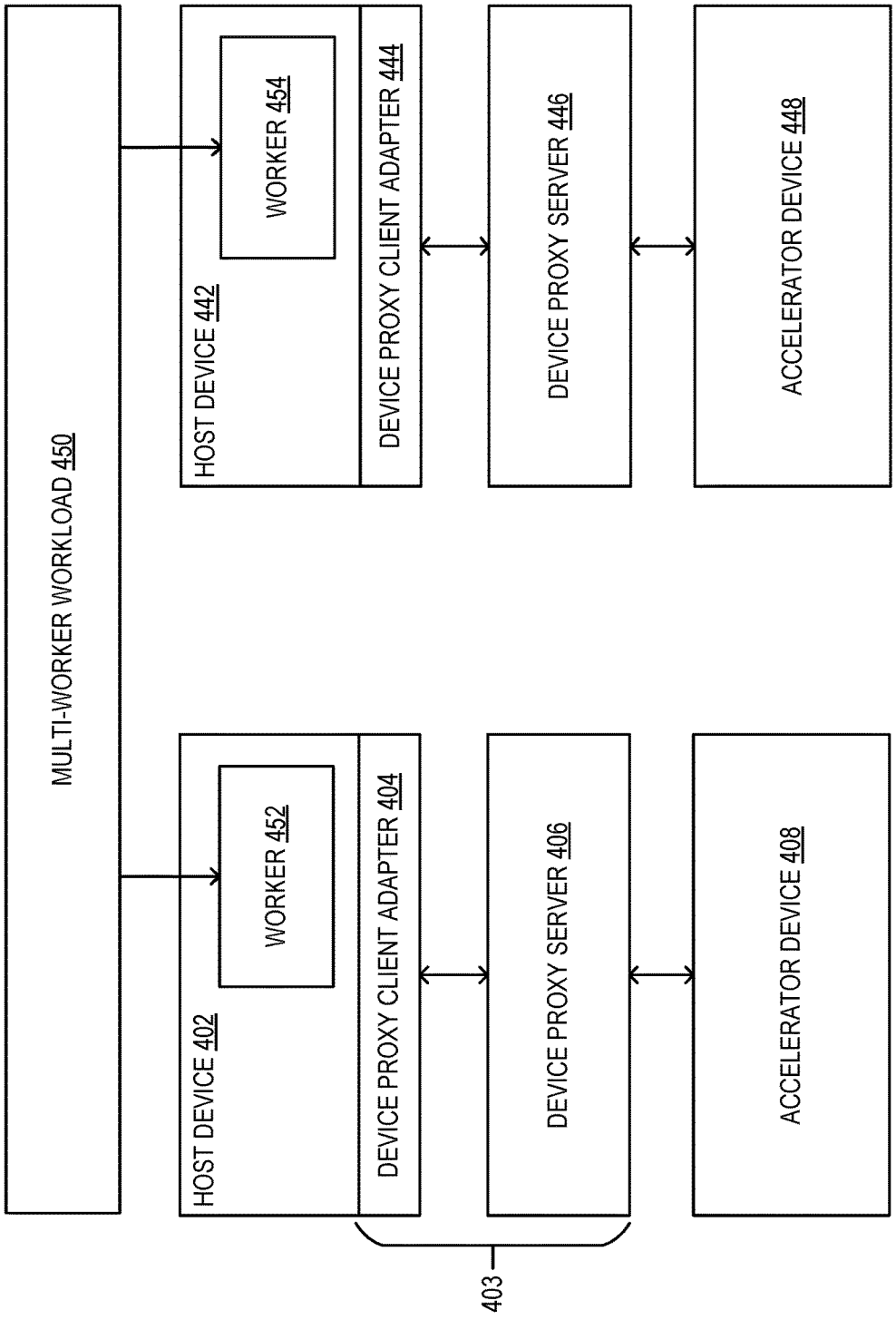
FIGS. 4A-B are block diagrams illustrating a system including a device proxy configured to facilitate elastic use of accelerator devices by worker processes of a multi-worker workload.
Figure 4B:
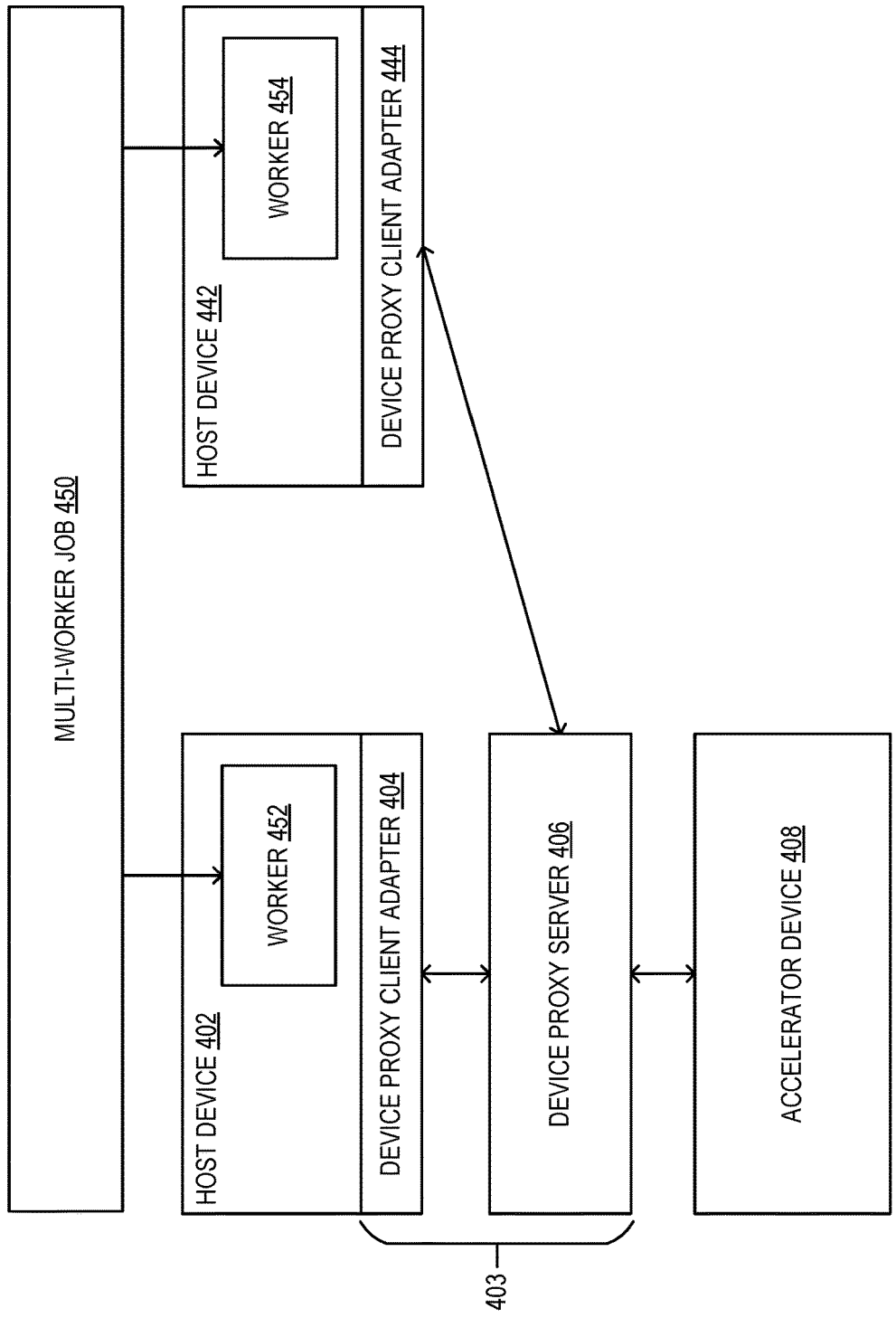

In some examples, the device proxy 203 is configured to operate in such a way that all workloads are elastic with respect to use of accelerator devices 208, regardless of whether the workload was written using libraries that handle elasticity. In such examples, the device proxy 203 is configured to provide elasticity-by-default for generic workloads at negligible resizing cost as described herein. The elasticity provided by the device proxy 203 works by decoupling logical parallelism of the workload (e.g., the number of ranks or workers, aka world-size) from physical accelerator devices and/or GPUs being used. The world size of the workload remains fixed in systems 200 with a device proxy 203, regardless of the number of physical accelerator devices 208 the workload uses at any given time. The device proxy 203 achieves this decoupling, in some examples, at least by transparent, low-overhead time-slicing of multiple workers/ranks on the same physical accelerator device 208. FIGS. 4A-B illustrate this. Transparent elasticity builds on top of the transparent migration support provided by the device proxy 203 and described above with respect to FIG. 3. To scale down to using fewer accelerator devices 208, the device proxy 203 simply takes a checkpoint of one or more of the workers on host devices 202 (e.g., via checkpointing libraries in a framework for checkpointing CPU applications), and migrates those processes to the single accelerator device 208 with time-slicing. Because of the properties of checkpoints, the workers resume from the same program state without redoing any computation, so the resize is work-conserving.

FIGS. 4A-B are block diagrams illustrating a system 400A-B including device proxy servers 406, 446 configured to facilitate elastic use of accelerator devices 408, 448 by worker processes 452-454 of a multi-worker workload 450. In some examples, the system 400A-B is part of or otherwise associated with a system such as system 200 of FIG. 2. Further, while the system 400A-B includes a multi-worker workload 450 with two workers 452 and 454 as illustrated, in other examples, more and/or different workers are distributed across more and/or different host devices and/or accelerator devices without departing from the description.

FIG. 4A illustrates the system 400A prior to the multi-worker workload 450 being scaled down from using two accelerator devices 408 and 448 to using a single accelerator device 408 as illustrated in FIG. 4B. The host device 402 hosts the worker 452 process which is configured to use the accelerator device 408. The calls to the accelerator device 408 by the worker 452 are intercepted by the device proxy client adapter 404 and then processed and/or managed by the device proxy server 406 as described herein. Similarly, the host device 442 hosts the worker 454 process which is configured to use the accelerator device 448. The calls to the accelerator device 448 by the worker 454 are intercepted by the device proxy client adapter 444 and then processed and/or managed by the device proxy server 446 as described herein.

FIG. 4B illustrates the system 400B after the multi-worker workload 450 has been scaled down from using two accelerator devices 408 and 448 to using a single accelerator device 408. The host device 402 still hosts the worker 452 process which is configured to use the accelerator device 408. The calls to the accelerator device 408 by the worker 452 are intercepted by the device proxy client adapter 404 and then processed and/or managed by the device proxy server 406 as described herein. Similarly, the host device 442 still hosts the worker 454 process, but accelerator device calls by the worker 454 are now directed to the accelerator device 408 by the device proxy client adapter 444 and the device proxy server 406 as described herein. The worker 452 and worker 454 share the accelerator device 408 through a process of semantics-aware time-slicing as described herein.

In some examples, the device proxy 403 of the system 400 is configured to enable the workers 452 and 454 to share the accelerator device 408 without sacrificing the quantity of memory of the accelerator device 408 to which they have access. This is important, as some workloads, such as training large DNN models, each worker process uses large quantities of memory and, in many cases, sharing the memory of a single accelerator device 408 is not possible. Instead, the device proxy 403 is configured to enable the sharing of the accelerator device 408 using semantics-aware time-slicing. Because the device proxy server 406 is decoupled from the worker processes 452 and 454, the same device proxy server 406 is shared across multiple processes (e.g., multiple workers of the workload 450). Because all interactions with the accelerator device 408 go through the device proxy server 406, it is configured to schedule the multiple workers 452 and 454 intelligently. For instance, the device proxy server 406 is configured to allow only one worker to execute at a given time on the accelerator device 408, and then to carefully chooses specific points at which to context switch to another worker. In some such examples, at the time of a context switch between workers, the device proxy 403 is configured to swap out the accelerator device 408 memory state used by the original worker (e.g., copying to host device 402 memory) and then swap in the accelerator device 408 memory state for the new worker, thus enabling each worker to use nearly the entire accelerator device 408 memory (e.g., GPU RAM). Additionally, the device proxy 403 is configured to optimize this memory state swapping process as described herein.

Context switches between workers are expensive with respect to time and the system 400 is configured to perform context switches only when necessary. When a worker is performing computations on its respective data (e.g., forward and backward pass operations such as matrix multiplications by a worker of a DNN training workload), there is no need to context switch. However, in some examples, at the end of processing a mini-batch by the worker, the data-parallel workers participate in collective communication (e.g., an allreduce process) to exchange gradients, which requires all workers to participate and contribute their respective gradients. Thus, the system 400 is configured to perform context switches at this point (e.g., the end of a mini-batch) in the operations of a worker. In some examples, within the processing of a single mini-batch, multiple asynchronous allreduce operation calls are issued to overlap compute with communication. After all allreduce operation calls associated with the mini-batch have been issued, a synchronization operation is performed on the accelerator device 408 before copying back the averaged gradients after the allreduce operations. In some such examples, at this point, the device proxy 403 is configured to perform a context switch to the next worker that is sharing the accelerator device 408. The device proxy 403 then enables that worker to execute on or otherwise use the accelerator device 408 exclusively until it hits the same point of collective communication. Then, the device proxy 403 is configured to perform a context switch to the next rank, and so on.

Further, in some examples, collective communication operations happen through proprietary libraries. These libraries provide interception using multi-GPU collection communication primitives. These libraries include the notion of a communicator which is initialized for a particular ring of participating workers, and subsequent operations (e.g., allreduce operations) reference the communicator. In some such examples, the interaction of these libraries with user-level time-slicing would be complex (e.g., the initiation API that sets up the communicator could deadlock during time-slicing). In such examples, the system 400 is configured to manage these issues by decoupling the logical data-parallel world size of the workload from the world size that is exposed to the libraries. For instance, the system 400 and/or the device proxy 403 specifically is configured to expose indications to the libraries such that they see only one worker per accelerator device 408. During time-slicing, the device proxy 403 is configured to perform local accumulation of collective communication operations into buffers and then to cause the buffered collective communication operations to be performed at one time, such that only the last worker sharing the accelerator device 408 performs operations associated with the collective communications (e.g., performing an allreduce operation with the result of the locally accumulated gradients).

While the above approach for time-slicing is sufficient from a correctness perspective, in some examples, it is prohibitively slow. For instance, in an example, a V100 GPU has 32 Gigabytes (GB) of RAM, and an A100 GPU has up to 80 GB of RAM, so a large model could use most of the RAM for a single worker. A single context switch (e.g., swapping out followed by swapping in of 32 GB of data each from host memory) per mini-batch processing would take 2-4 seconds, while the mini-batch processing computation time itself could be much less (e.g., in the hundreds of milliseconds), resulting in an overhead of 5-10 times. For elasticity to be feasible by default, the systems and methods described herein are configured to enable such context switches with negligible overhead. In some such examples, the systems and methods are configured to perform a technique called replica splicing that makes context switches much cheaper with respect to time and resources. Replica splicing is described in greater detail herein with respect to at least FIGS. 5A-B.

Figure 5A:
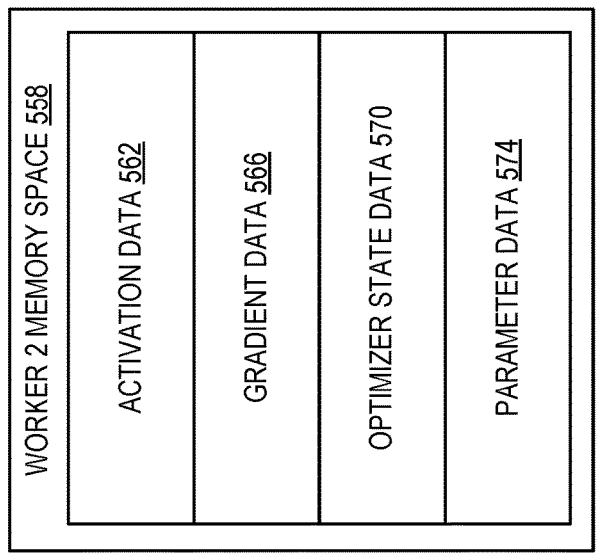
FIGS. 5A-B are block diagrams illustrating memory space structure of accelerator devices used by worker processes during processing of a multi-worker workload.
Figure 5A:
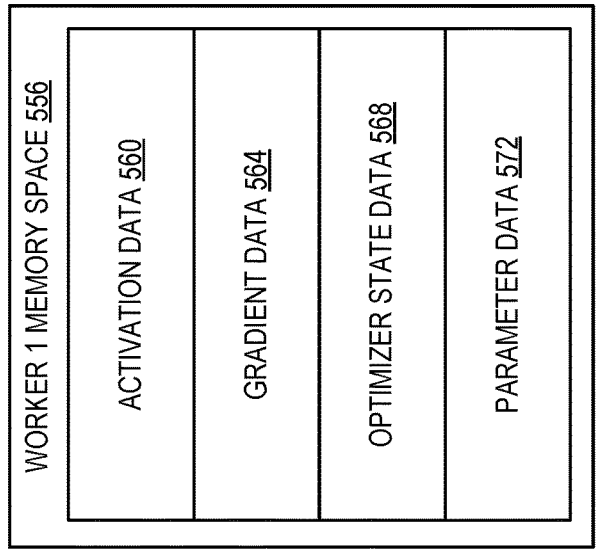
Figure 5B:
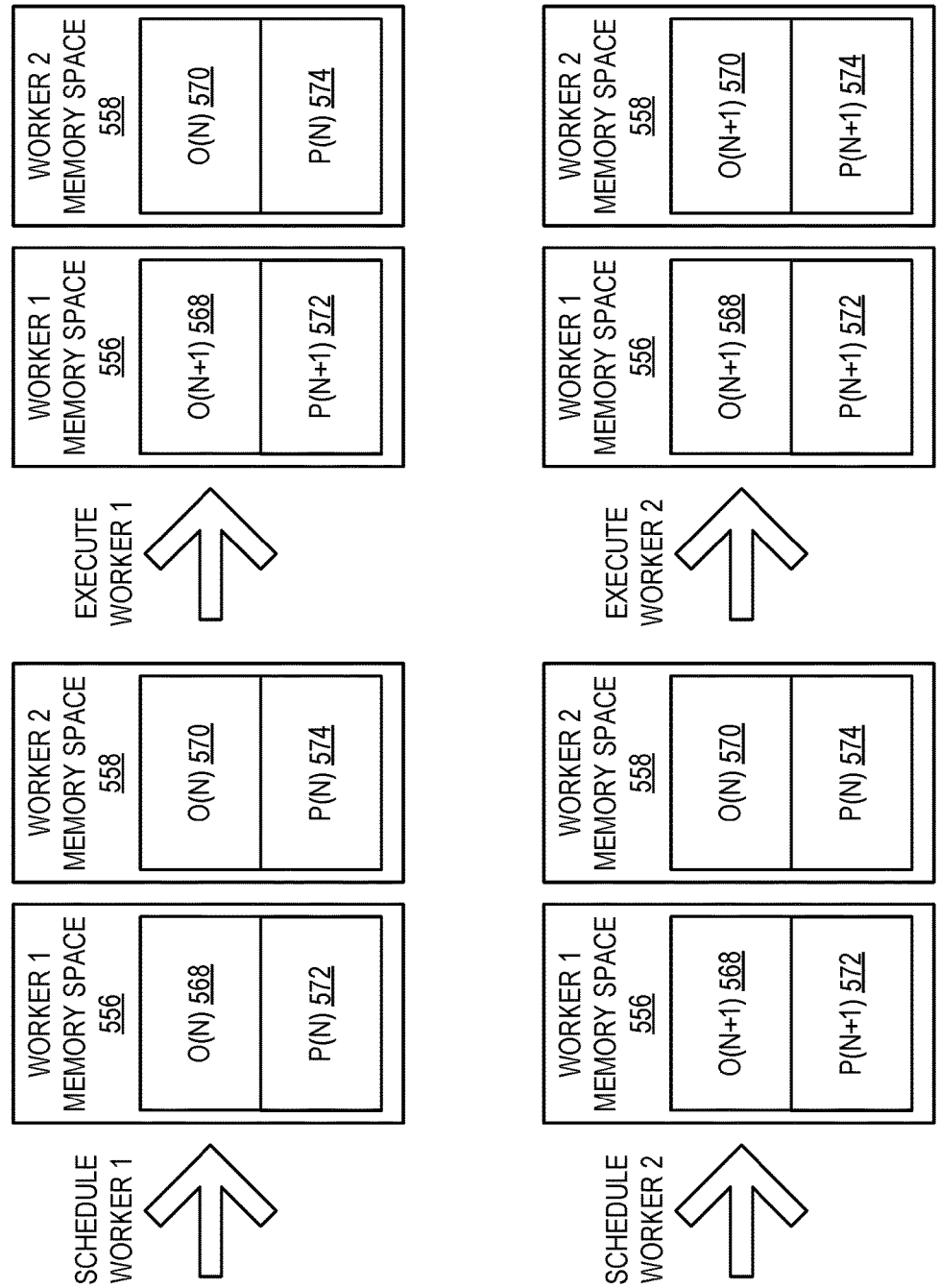

FIGS. 5A-B are block diagrams illustrating memory space structure 500A-B of accelerator devices (e.g., accelerator devices 208, 308, and/or 408) used by worker processes (e.g., workers 327, 329, 452, and/or 454) during processing of a multi-worker workload (e.g., workload 450). In some examples, the memory space structures 500A-B are included in or otherwise associated with a system such as systems 200, 300, and/or 400 without departing from the description. Further, in some examples, the memory space structures 500A-B include buffers and/or other data structures that are stored in the memory of accelerator devices during the execution of workers that make use of those accelerator devices. Additionally, the workers described herein are associated with DNN model training workloads, but in other examples, other types of workloads and associated workers are used without departing from the description.

In some examples, the accelerator device memory consumed by a training worker process (e.g., the worker 1 memory space 556 and the worker 2 memory space 558) falls into four example categories: parameter data (e.g., parameter data 572 and 574) which include the weights/parameters for each layer of the model; forward and backward pass run on these weights, optimizer state data (e.g., optimizer state data 568 and 570) which includes states tracked by the optimizer to compute the delta to apply on parameters for each iteration of the training process, gradient data (e.g., gradient data 564 and 566) which includes data that tracks historic state (e.g., first and second moments of gradients), and activation data (e.g., activation data 560 and 562) which includes the intermediate output of the forward pass for each layer of the model during training and is used during backward passes to compute gradients relative to input for back propagation.

Each replica, or each worker, has its own copy of gradients in gradient data corresponding to its mini-batch process. At the end of the backward pass portion of a mini-batch process (e.g., the end of the execution of the last worker in the set of workers of the workload), the gradients of all workers are averaged, and the result is then used to update weights of the associated model consistently.

In some examples, among data-parallel workers, the parameters (P) and optimizer state (O) proceed in lockstep in that they are updated at the end of the mini-batch process consistently by all workers, with the (same) averaged gradients. Thus, at the end of a mini-batch process, the tensors, vectors, or other data structures corresponding to P and O will be identical across workers sharing the accelerator device. Further, at the end of the mini-batch process, activations (A) are freed, as the backward pass has completed, and they are no longer needed. Based on these factors, the swapping out and/or swapping in of the data buffers associated with parameters, optimizer state, gradients, and activations during context switching are conditional as described herein. As the device proxy controls the memory allocator, it has visibility into each buffer that is allocated by the framework.

In some examples, during a context switch, the device proxy (e.g., device proxy 203 and/or 403) computes content checksums for each live buffer, where the live buffers include the activation data buffer 560, the gradient data buffer 564, the optimizer state data buffer 568, and the parameter data buffer 572 for worker 1 memory space 556 in an example. Additionally, or alternatively, in some such examples, the activation data buffer 560 is not swapped in or out during a context switch as it is only used during execution and its state does not need to be saved. During the process of swapping out the accelerator device memory state of a worker during a context switch, the device proxy first looks up whether the host device memory already contains a buffer with the same content checksum. If a matching content checksum of a buffer is identified in the host device memory, it refrains from the swapping that buffer out of the accelerator device memory and simply marks that buffer as unused in the accelerator device memory or otherwise causes the memory of the buffer to be released or freed (in some examples, garbage collection happens lazily when there is demand for fresh allocations by the new worker, so that multiple versions are cached opportunistically in the accelerator device). Similarly, during the process of swapping in accelerator device memory state of a new worker's data, the device proxy checks whether the device already has a buffer with that checksum; if so, it refrains from swapping in the buffer from host. Further, in some examples, although the content of matched buffers matches, the new worker may have allocated a different device address for that content. In such cases, the device proxy performs a move of that buffer within the memory of the accelerator device to the desired address, which is much cheaper than a swap-in from the host device (e.g., bandwidth within the accelerator device memory is 900 Gigabytes per second (GB/s) vs. bandwidth from the host device of 16 GB/s).

For instance, in an example, if a worker 1 associated with the worker 1 memory space 556 is being swapped out for a worker 2 associated with the worker 2 memory space 558, content checksums for the optimizer state data 568 buffer and the parameter data 572 buffer are generated by the device proxy. Those checksums are compared to checksums of buffers that are present in the host device memory to determine whether the content of the optimizer state data 568 buffer and the parameter data 572 buffer are already present in the host device memory. If a matching checksum of the generated checksum of the optimizer state data 568 buffer is identified, then the optimizer state data 568 buffer data is not swapped out to the host device memory. Instead, in some examples, the buffer associated with the matching checksum in the host device memory is associated with the worker 1 to be treated as the optimizer state data 568 buffer of worker 1 during future context switches. Alternatively, if the optimizer state data 568 buffer checksum is not identified in the host device memory, then the buffer is swapped out of the accelerator device memory to the host device memory in order to preserve the data buffer for use by worker 1 during future executions. The same process is performed with respect to the parameter data 572 buffer.

Further, in this example, the optimizer state data buffer and parameter data buffer of the worker 2 are to be swapped into accelerator device memory from host device memory, if necessary, as part of the context switch that will enable the worker 2 to be executed. Content checksums for the optimizer state data buffer and the parameter data buffer of the worker 2 as stored in the host device memory are generated by the device proxy. Those checksums are compared to checksums of buffers that are present in the accelerator device memory to determine whether the content of the optimizer state data buffer and the parameter data buffer are already present in the accelerator device memory. If a matching checksum of the generated checksum of the optimizer state data buffer is identified, then the optimizer state data buffer data is not swapped out to the host device memory into the optimizer state data 570. Instead, in some examples, the buffer associated with the matching checksum in the accelerator device memory is associated with the worker 2 to be treated as the optimizer state data 570 buffer of worker 2 during execution after the context switch. Alternatively, if the optimizer state data buffer checksum is not identified in the accelerator device memory, then the buffer is swapped out of the host device memory to the accelerator device memory as optimizer state data 570 buffer in order to preserve the data buffer for use by worker 2 during its execution. The same process is performed with respect to the parameter data 574 buffer.

FIG. 5B is a diagram illustrating memory space structure 500B during a process of executing two workers on an accelerator device using the described time-slicing techniques. First, a worker 1 is scheduled and the worker 1 memory space 556 includes a first version (N) of an optimizer state (O) buffer 568 and a parameter (P) buffer 572 and the worker 2 memory space 558 includes the same first version (N) of an O buffer 570 and a P buffer 574. After the worker 1 is computed or otherwise executed, the worker 1 memory space 556 includes a second version (N+1) of the O buffer 568 and the P buffer 572 as a result of the execution of worker 1. The worker 2 memory space 558 remains the same as before the execution of worker 1. In some examples, at this point, a context switch is performed when worker 2 is scheduled, such that the memory state of worker 1 is swapped out of the accelerator device memory and the memory state of worker 2 is swapped in to the accelerator device memory as described herein.

Then, the worker 2 is executed, the worker 2 memory space 558 includes as second version (N+1) of the O buffer 570 and the P buffer 574 as a result of the execution of worker 2. In some examples, a context switch is performed to switch to another worker, which may be worker 1, to continue execution of the multi-worker workload with which worker 1 and worker 2 are associated. In some such examples, the context switch includes matching checksums of the buffers 570 and 574, which are in the accelerator device memory, to checksums of the buffers 568 and 572, which are in the host device memory and, upon determining that the checksums match, the buffers 570 and 574 are not swapped out to the host device memory, avoiding that relatively expensive swap out process as described herein.

In examples using the above-described optimization, if multiple workers are sharing a single accelerator device, the swap-out of parameter data (P) and optimizer state data (O) buffers during context switching needs to be done only for the first worker. Other workers are then able to identify matching already present in host memory and omit the swapping process. However, in some such examples, the swapping in of buffers from the host device memory to the accelerator device memory must still be done for each worker. When a worker starts its time-sliced execution, its local state contains P and O from the previous mini-batch process, while the previous rank's copy is updated to the current mini-batch process. However, in some such examples, the system is configured to avoid the swapping in of P and O buffers if there is space to store two additional versions of P and O within the accelerator device memory (for any time-slicing factor greater than two). There are at most two versions of P and O that are active: the current mini-batch process and previous mini-batch process, and the third copy is needed as scratch space so that the current rank does not overwrite the previous mini-batch process' pristine version of P and O which would be needed by the next rank.

Further, in some examples, the device proxy is configured to address challenges associated with such a process. The additional space required for two extra copies of P and O buffers is unacceptable for large models and device-to-device copies of P and O would need to be performed for each context switch process, as each worker may have allocated the same buffers to different addresses. The device-to-device copy cost is nontrivial because of cyclic dependencies between thousands of source and destination buffers forces the copy to happen in phases, thus limiting parallelism.

In examples where workers allocate their own P and O buffers, it is possible that they are assigned to different address locations, which presents challenges during context switching. In such examples, the described device proxy and associated methods are configured to use domain knowledge about deep learning training to cause the addresses to be allocated consistently without requiring explicit co-ordination between workers. Within data-parallel workers, the allocation sequence (allocation size, ordering) for "stable" buffers, such as P and O buffers (which are preserved across mini-batch processes), must be the same across all workers, because they have identical sets of parameters. However, there could be other allocations that are variable-sized across replicas (e.g., allocations that depend on input data size which may vary across mini-batch processes, allocations that only rank 0 does, etc.); as a result, the state of the memory allocation diverges across workers, causing even the stable buffer allocations (that are interleaved with other allocations) to be allocated to misaligned addresses between workers. To handle this, the device proxy is configured to use a bidirectional memory allocator. Stable buffers and/or other non-transient memory allocations (such as P and O) get allocated at a first extreme (e.g., the high end) of the address space, while other buffers get allocated at the opposite extreme (e.g., the low end). This ensures that instability in the transient memory allocations does not affect the memory allocator metadata in the region associated with the stable buffers, thus ensuring that the stable buffers such as P and O get the same addresses across workers. This has been empirically validated across a wide range of models and PyTorch versions. In some such examples, to identify stable buffers such as P and O, the allocator of the device proxy is seeded with a set of allow-listed stack traces (python and C++) pertaining to parameter and optimizer state allocations. At the time of allocation, the device-proxy client gets the client stack trace and matches against this allow list.

Further, in some examples, the described systems and methods associated with the device proxy are configured to avoid generation and/or copying of multiple copies of P and O using another domain-specific insight. In such examples, all data parallel workers will arrive at the same version of P and O buffers after the completion of a mini-batch process. P and O buffers are updated only after the collective communication operations associated with the gradients between the workers is completed (e.g., an allreduce operation). Thus, if the operations that update parameters and optimizer state are identified, those operations can be performed only in one of the workers, which may be called the "root" worker. Such operations in other workers are "squashed", or otherwise prevented from being performed because they would result in the same final state, and the P and O buffers have the same corresponding addresses across workers, so subsequent mini-batch computation will access and use the right data. Additionally, or alternatively, the device proxy can simply omit issuing commands (e.g., LaunchKernel commands) to the accelerator device for those operations. With such squashing, swapping in the previous version of P and O buffers is avoided because they are no longer updated by any worker other than the root worker.

However, there are multiple challenges in performing such squashing. First, the perimeter within which squashing must be enabled is identified. In some examples, to achieve this, a change is made to the system to add hooks before and after an optimizer step is invoked, wherein the hooks are configured to trigger or otherwise activate or enable the squashing process. In such examples, this is called the pre-optimizer step and post-optimizer step. Second, squashing relies on the described domain-specific assumptions regarding the memory space structure in a way that could affect correctness. For example, if annotations are missed and the system is not able to get consistent addresses for P and O buffers, it will only result in a higher context switch cost based on performing more swap-ins and swap-outs of memory states.

Further, in some examples, the system is configured to perform conservative validation, wherein the first mini-batch process is run with squashing disabled (thus incurring the swap-in/swap-out cost). This first mini-batch process is guaranteed to be correct execution, even though the time and resource cost is relatively high. One challenge with the conservative validation process is that it does not have access to the read/write set of an accelerator device operation (such as LaunchKernel) directly at the interception layer because the parameters to the operation could be indirect addressed via multiple levels of accelerator device buffers, which is inaccessible to the device proxy. Conservative validation therefore relies on an approach of using buffer content checksums to infer the effect of an operation post-facto.

In some examples, during this validation mini-batch process, the system verifies that the model conforms to the following invariants:
1. All buffer mutations between pre-optimizer step and post-optimizer step must be identical across all ranks sharing the accelerator device. The buffer checksums are snapshotted at those two points. The differential between the buffer states indicates mutations performed by the optimizer. These mutations must be identical in all respects (e.g., the same addresses, the same checksums, and/or the same size).

2. Accelerator device-to-host copies performed between pre-optimizer step and post-optimizer step must copy the same data across all ranks sharing the accelerator device. If the above validation fails, the model is treated as unsafe for the squashing process, and the system falls back to the swap-based mechanism. If the model has available space in the accelerator device memory for multiple copies of P and O buffers, the model could still run efficiently, but in general, there will be a performance hit. Thus, a potential correctness problem is converted into a performance problem.

In some such examples, from the perspective of the scheduler, a high overhead time-slicing is counter-productive for cluster efficiency and, therefore, the overhead is monitored due to time-slicing. If it exceeds a threshold (e.g., greater than 3% of mini-batch process time), time-slicing for that model is disabled.

The description so far has focused on data-parallel jobs. Handling model-parallel jobs such as tensor-parallel and pipeline-parallel jobs, brings up new challenges. For example, a tensor-parallel job performs allreduce operations for every matrix multiplication in forward and backward passes. If there is a context switch for such allreduce operations, the described worker replica splicing would not work because activations would still be live. Similarly, pipeline-parallel jobs perform peer-to-peer sending and receiving of activations and gradients across GPUs/nodes for every micro-batch. Time-slicing during the micro-batch would cause excessive swap-ins and/or swap-outs because of live gradients and activations. To address these challenges, in some examples, the described systems and methods associated with device proxies use two key techniques: splicing-aware placement and inferring intent of collective calls. In examples where splicing-aware placement is used, only data-parallel workers of the same model-parallel partition are time-sliced on the same accelerator device. For example, to run an 8-worker job with 4-way pipelining and 2-way data parallelism on four physical accelerator devices, the device proxy and/or other system components are configured to place the two data parallel workers of the same pipeline stage in each accelerator device. The same splicing-aware placement is applied to 3D parallel workloads in some examples. The workers that are time-sliced within the same accelerator device are placed such that they belong to the same pipeline stage and the same tensor-parallel partition. In such examples, the system is configured to be aware of the worker assignment logic. Some popular libraries have the same worker assignment logic across the parallelism dimensions, and this logic is mirrored in the described system. For workloads using a custom launcher with different worker assignment policy, the system is configured to provide an API for the workload to communicate the worker-to-topology mapping for all worker ranks (e.g., Rank 4 is DP0, MP0, PP1 etc.).

Second, in some examples, the device proxy infers the intent of collective communications, and triggers time-slicing only on collective calls in the data-parallel dimension. Other collective calls simply pass through without triggering a context switch, which is correct because completion of those calls only depend on workers executing on other accelerator devices and do not require input from other data-parallel workers that are time-sliced in the same accelerator device. However, inferring the intent of a particular allreduce call or other similar collective communication transparently is challenging, as each model could have its own control flow and ordering across communication in multiple dimensions of parallelism. The described system is configured to leverage the initialization path of collective communication (e.g., CommInitRank) to achieve this. It forces a context switch after every CommInitRank, and the device proxy (that is shared across all workers using the same device) keeps a per-communicator count. After a full round of context switches, if the local count for a communicator is greater than one, the device proxy infers that the communicator is in the data-parallel dimension (because of splicing-aware placement above). During a collective call, the device proxy is configured to look up a map on communicator ID and determine whether it is a data-parallel collective communication. As a result of the determination, the device proxy triggers the semantics-aware time-slicing only for those.

Some systems shard the data-parallel state (e.g., partitioning the training of a neural network, represented as a computational graph, across multiple processors, each of which computes a portion of the graph) such that there is no redundancy across data-parallel workers. Sharding optimizer states across distributed data-parallel processes reduces the per-process memory footprint. Such partitioning violates the conditions for the described squashing validation process. In some examples, the described systems and methods are configured to facilitate partial sharding, which decouples the sharding factor (e.g., a minimum needed to make the model fit in an accelerator device) from the data-parallelism degree configured for parallelism. If the two values are equal, the model is not shrinkable to fewer accelerator devices as it cannot fit. If the data-parallelism factor is higher (e.g., 4 times the sharding factor), then it still supports up to 4-way time-slicing/scaling down for that model. In such examples, the partial sharding factor becomes another dimension of model parallelism, and only workers of the same shard will be time-sliced as described herein.

In some examples, efficient replica-splicing requires identification of gradient allocations to avoid swapping them out during context switching, as their pre-allreduce local content is not useful after the allreduce is issued. However, in some such examples, the regular call-stack allow list does not work for gradients because two types of gradient buffers are allocated together: gradients on parameters, and gradients on activations. While the former buffers match across workers, the latter buffers depend on input size and hence can cause divergence in memory allocator state across workers. To separate these, the system is configured to install a backward hook that reallocates the gradients in the first mini-batch process and frees the original allocation. The original allocation is made as an unknown buffer, but the reallocation will match the allow list and hence be part of the stable portion of the address space.

Because of the temporal deduplication (dedup) that the described system performs, the subsequent checkpoints are about 10× smaller than the first checkpoint. Even the first checkpoint is less than 1 GB per worker in most cases, which is quite manageable, even for workloads with 1000 or workers.

In some examples, a core enabler for transparent elasticity is the ability to time-slice multiple workers on the same GPU with replica splicing. With N-way time-slicing, mini-batch processing time is expected to reduce by a factor of N (fewer resources, same work). Any increase beyond this is overhead. The overhead introduced by time-slicing in scaled-down mode is less than 5% for most models, demonstrating the efficacy of replica splicing.

It should be understood that while, in many described examples, two workers (e.g., workers 452 and 454) are described as executing portions of a multi-worker workload (e.g., multi-worker job 450), in other examples, more workers are used to perform such workloads without departing from the description. For instance, in some such examples, a multi-worker workload has N workers that are using M accelerator devices, where N is divisible by M (e.g., the specific examples described above describe a system where N=2 and M=1). On each of the M devices, N/M workers are allocated to take turns with processing their respective portions of the workload as described herein. Further, in some such examples, when a worker allocated to a device has completed one unit of work on the workload, local collective operations are performed and then the device switches to the next worker. When all the N workers across the M devices finish a unit of work, a global collective operation is performed among all the M devices (e.g., sharing of model training results to inform the next iteration, synchronizing data being used for the workload, or the like). This process then repeats with units of work performed by each worker again.

Further, in some examples, the disclosure enables a multi-worker workload to automatically and/or dynamically transition from the use of one set of accelerator devices to another set of accelerator devices of a different size. For instance, in an example, an N-worker workload is being executed on a set of N/4 devices. Another set of N/4 devices becomes available. The system detects the newly available resources and migrates or otherwise reorganizes the workers of the N-worker workload to use both set of N/4 devices, such that it is now using N/2 devices. Thus, the resources of the system are fully used and the rate at which the workload can be completed is improved through the use of the additional set of devices.

Figure 6:
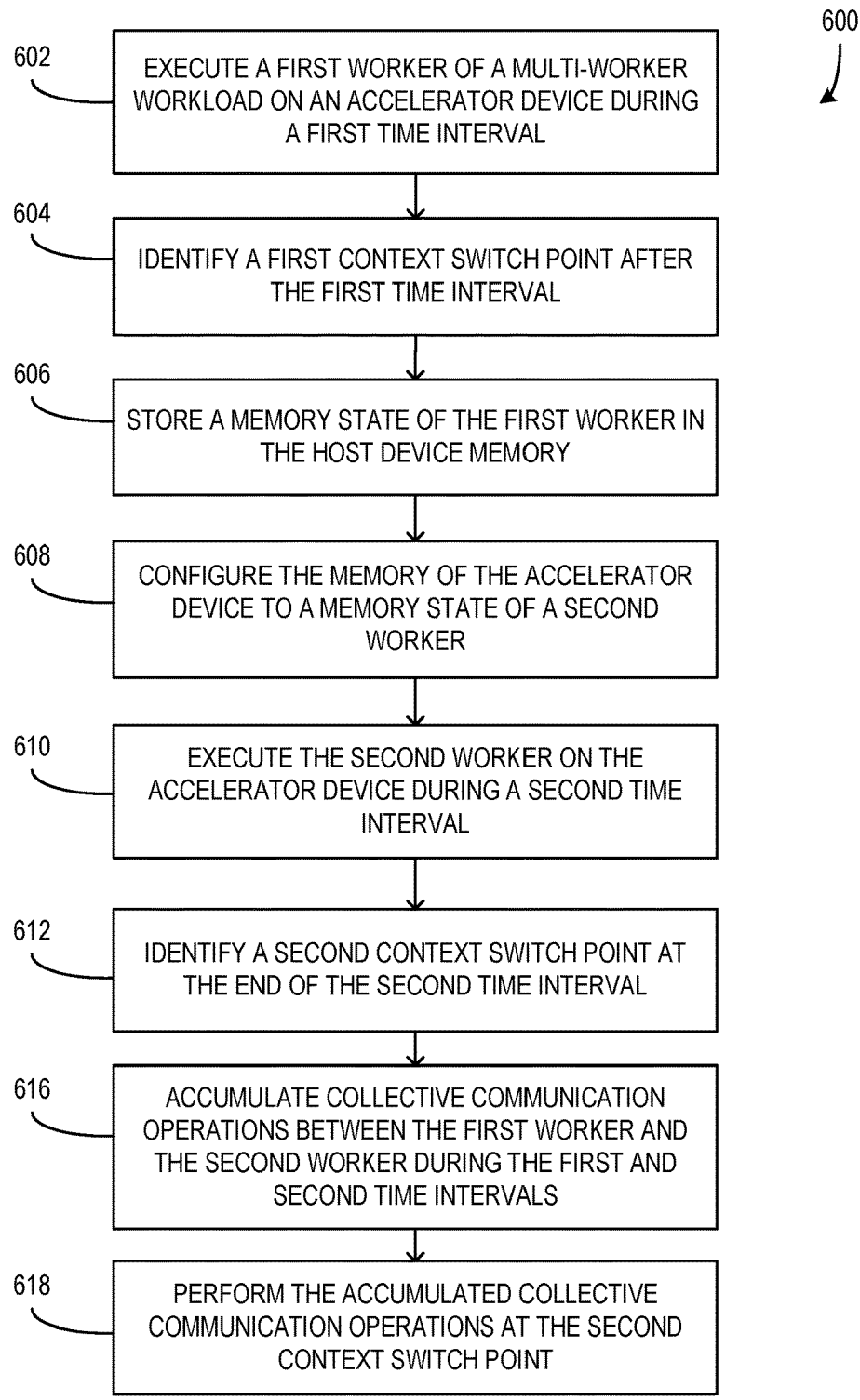
FIG. 6 is a flowchart illustrating a method for executing multiple workers of a multi-worker workload using a single accelerator device.

FIG. 6 is a flowchart illustrating a method 600 for executing multiple workers (e.g., workers 452-454) of a multi-worker workload (e.g., multi-worker workload 450) using a single accelerator device (e.g., an accelerator device 408). In some examples, the method 600 is executed or otherwise performed by a system such as systems 100, 200, 300, 400A-B, and/or 500A-B of FIGS. 1, 2, 3, 4A-B, and/or 5A-B, respectively.

At 602, a first worker of a multi-worker workload is executed on an accelerator device during a first time interval and, at 604, a first context switch point is identified after the first time interval.

At 606, a memory state of the first worker is stored in the host device memory at the first context switch point, and At 608, the memory of the accelerator device is configured to a memory state of a second worker. In some examples, the storing and configuring of memory states includes writing a first subset of memory data sets of a plurality of memory data sets to a first extreme of an address range of the memory of the accelerator device, wherein the first subset of memory data sets includes stable memory data sets that tend to be synchronized across equivalent memory states of the first and second worker. A second subset of memory data sets of the plurality of memory data sets is written to a second extreme of the address range of the memory of the accelerator device, wherein the second extreme is opposite the first extreme of the address range. For instance, in an example, the stable memory data sets are written to the high extreme of the address range and other memory data sets are written to the low extreme of the address range.

In some such examples, the stable memory data sets include a parameter data buffer and/or an optimizer state data buffer.

At 610, the second worker is executed on the accelerator device during a second time interval and, at 612, a second context switch point is identified at the end of the second time interval.

After the second time interval, a second memory state of memory of the accelerator device associated with the second worker in the second worker state is not stored in the host device memory based at least in part on the stored first memory state matching the second memory state. In other examples, the portions of the stored first memory state that match the second memory state are not stored in the host device memory again, while other portions of the second memory state that do not match the stored first memory state are stored in the host device memory as the accelerator device is reconfigured to execute the first worker again.

At 616, collective communication operations between the first worker and the second worker are accumulated during the first and second time intervals and, at 618, the accumulated collective communication operations are performed at the second context switch point. In some examples, the performance of the accumulated collective communication operations includes the second worker performing the operations while the first worker is prevented from performing the operations (e.g., the operations are redundant and need only be performed by one of the workers at the end of one full batch of executions of the workers as described herein). Further, in some such examples, operations that are performed on stable memory buffers associated with the second worker based at least in part on the performed accumulated collective communication operations are detected. Equivalent operations to be performed on an equivalent stable memory buffer associated with the first worker are prevented or otherwise refrained from to further avoid redundant processing. The system enables the first worker to make use of the stable memory buffers associated with the second worker due to how the multi-worker workloads are configured to operate as described herein.

Further, in some examples, the method 600 includes intercepting instructions associated with the multi-worker workload from a host device, wherein the intercepted instructions include address references associated with a host device address space. The address references associated with the host device address space are translated into address references associated with an accelerator device address space of the accelerator device. Then, operations associated with the intercepted instructions are performed using the translated address references, wherein the performed operations include executing the first worker and executing the second worker. In some such examples, the interception of the instructions and translation of address references is performed by a device proxy such as device proxy 203, including a device proxy client adapter 204 and a device proxy server 206 as described herein.

Additionally, or alternatively, in some examples, the multi-worker workload is a model training workload and storing the memory state of the first worker in the host device memory includes identifying data buffers of the memory state including at least an activation data buffer, a gradient data buffer, an optimizer state data buffer, and a parameter data buffer. The optimizer state data buffer and the parameter data buffer are stored in the host device memory, whereby states of the optimizer state data buffer and parameter data buffer are preserved after the first context switch point. The memory of the activation data buffer and the gradient data buffer is freed, whereby states of the activation data buffer and the gradient data buffer are not preserved after the first context switch point.

In some examples, the systems and methods for executing a multi-worker workload as described herein includes detecting or otherwise determining when the available resources of the system change and automatically reconfiguring the resources to make use of them. For instance, in some examples, if another accelerator device becomes available when the multi-worker workload is being executed on fewer accelerator devices than there are workers in the workload (e.g., two workers executing on a single accelerator device as described above), the newly available accelerator device is reconfigured to execute one or more of the workers of the multi-worker workload and the quantity of workers assigned to other accelerator devices is decreased. In this way, the workers of a multi-worker workload are dynamically assigned to or otherwise spread across available accelerator devices when possible to enhance the efficiency of usage of the system resources and to improve the rate at which the multi-worker workloads are completed when possible.

Further, in some examples, the multi-worker workload that is being executed is a workload configured to train a deep learning model or other AI model. In such examples, the described methods make use of knowledge about the data structures used and the like (e.g., knowledge about the content and location of different data buffers used in such workloads) to improve the efficiency of resource usage and execution of such deep learning models.

Figure 7:
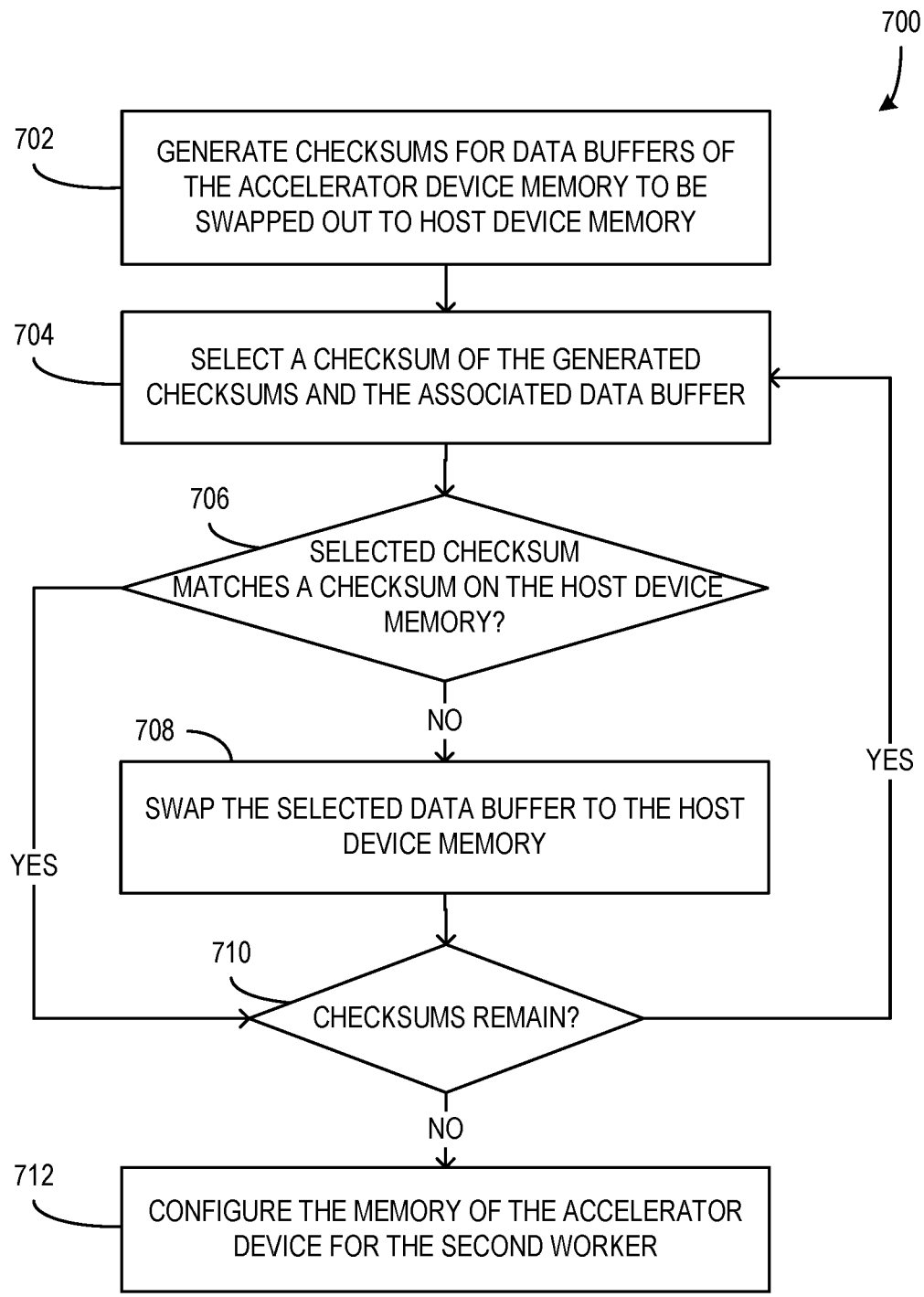
FIG. 7 is a flowchart illustrating a method for optimizing context switches between workers that are sharing an accelerator device.

FIG. 7 is a flowchart illustrating a method 700 for optimizing context switches between workers 9 e.g., workers 452-454) that are sharing an accelerator device (e.g., an accelerator device 408). In some examples, the method 700 is executed or otherwise performed by a system such as systems 100, 200, 300, 400A-B, and/or 500A-B of FIGS. 1, 2, 3, 4A-B, and/or 5A-B, respectively. Further, in some examples, the method 700 is performed during a context switch between workers as described above at least with respect to method 600 of FIG. 6. In some examples, the method 700 is performed as part of storing the memory state of the first worker at 606 and/or configuring the accelerator device memory to a memory state of the second worker at 608.

At 702, checksums are generated for data buffers of the accelerator device memory to be swapped out to host device memory.

At 704, a checksum of the generated checksums is selected, and the data buffer associated with the selected checksum is selected. At 706, if the selected checksum matches a checksum on the host device memory, the process proceeds to 710. Alternatively, if the selected checksum does not match a checksum on the host device memory, the process proceeds to 708.

At 708, the selected data buffer is swapped to the host device memory from the accelerator device memory.

At 710, if checksums remain to be selected, the process returns to 704 to select a new checksum of the set of generated checksums. Alternatively, if no checksums remain, the process proceeds to 712.

At 712, the memory of the accelerator device is configured for the second worker (e.g., the memory is updated with data reflective of a memory state of the second worker). In some examples, this configuration of the memory of the accelerator device further includes using checksum comparisons to determine which data buffers are swapped into the memory of the accelerator device from the host device memory in substantially the same manner as the checksum comparisons are used from 704-710.

Exemplary Operating Environment

Figure 8:
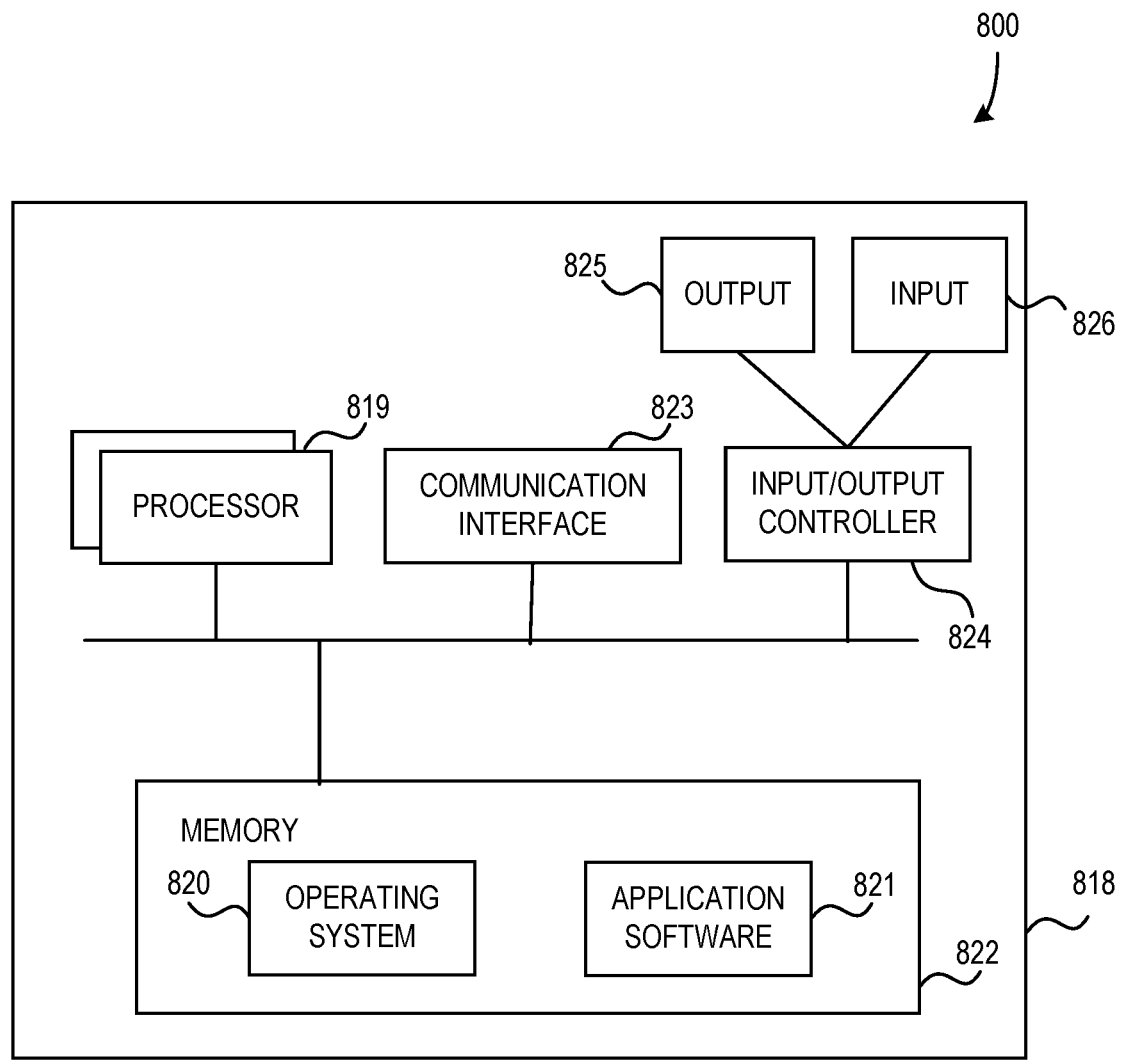
FIG. 8 illustrates an example computing apparatus as a functional block diagram.

The present disclosure is operable with a computing apparatus according to an embodiment as a functional block diagram 800 in FIG. 8. In an example, components of a computing apparatus 818 are implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hard-coded machine. In some examples, platform software comprising an operating system 820 or any other suitable platform software is provided on the apparatus 818 to enable application software 821 to be executed on the device. In some examples, elastically managing the execution of workers of multi-worker workloads on accelerator devices as described herein is accomplished by software, hardware, and/or firmware.

In some examples, computer executable instructions are provided using any computer-readable media that are accessible by the computing apparatus 818. Computer-readable media include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that, in some examples, the storage is distributed or located remotely and accessed via a network or other communication link (e.g., using a communication interface 823).

Further, in some examples, the computing apparatus 818 comprises an input/output controller 824 configured to output information to one or more output devices 825, for example a display or a speaker, which are separate from or integral to the electronic device. Additionally, or alternatively, the input/output controller 824 is configured to receive and process an input from one or more input devices 826, for example, a keyboard, a microphone, or a touchpad. In one example, the output device 825 also acts as the input device. An example of such a device is a touch sensitive display. The input/output controller 824 may also output data to devices other than the output device, e.g., a locally connected printing device. In some examples, a user provides input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: at least one processor; and at least one memory comprising computer program code, the at least one memory and the computer program code configured to, with the at least one processor, cause the at least one processor to: execute a first worker of a multi-worker workload on an accelerator device during a first time interval; identify a first context switch point at an end of the first time interval at which point the first worker is in a first worker state and the accelerator device is reconfigured to execute a second worker, wherein further execution of the multi-worker workload depends on executing the second worker based at least in part on the first worker being in the first worker state; store, at the identified first context switch point, a first memory state of the accelerator device associated with the first worker in the first worker state in a host device memory, wherein the first memory state includes at least a portion of non-transient memory allocations associated with the first worker state; configure, at the identified first context switch point, the memory of the accelerator device to a second memory state associated with the second worker; execute the second worker of the multi-worker workload on the accelerator device using the configured memory during a second time interval; identify a second context switch point at an end of the second time interval at which point the second worker is in a second worker state that is equivalent to the first worker state and the accelerator device is reconfigured to execute the first worker; wherein the stored first memory state matches a second memory state of the accelerator device associated with the second worker in the second worker state in the host device memory at the identified second context switch point; accumulate collective communication operations between the first worker and the second worker during the first and second time intervals; and perform the accumulated collective communication operations at the identified second context switch point.

An example computerized method comprises: executing, by a processor, a first worker of a multi-worker workload on an accelerator device during a first time interval; identifying, by the processor, a first context switch point at an end of the first time interval at which point the first worker is in a first worker state and the accelerator device is reconfigured to execute a second worker, wherein further execution of the multi-worker workload depends on executing the second worker based at least in part on the first worker being in the first worker state; storing, by the processor, at the identified first context switch point, a first memory state of the accelerator device associated with the first worker in the first worker state in a host device memory, wherein the first memory state includes at least a portion of non-transient memory allocations associated with the first worker state; configuring, by the processor, the memory of the accelerator device to a second memory state associated with the second worker at the identified first context switch point; executing, by the processor, the second worker of the multi-worker workload on the accelerator device using the configured memory during a second time interval; identifying, by the processor, a second context switch point at an end of the second time interval at which point the second worker is in a second worker state that is equivalent to the first worker state and the accelerator device is reconfigured to execute the first worker; wherein the stored first memory state matches a second memory state of the accelerator device associated with the second worker in the second worker state in the host device memory at the identified second context switch point; accumulating, by the processor, collective communication operations between the first worker and the second worker during the first and second time intervals; and performing, by the processor, the accumulated collective communication operations at the second context switch point.

One or more computer storage media have computer-executable instructions that, upon execution by a processor, cause the processor to at least: execute a first worker of a multi-worker workload on an accelerator device during a first time interval; identify a first context switch point at an end of the first time interval at which point the first worker is in a first worker state and the accelerator device is reconfigured to execute a second worker, wherein further execution of the multi-worker workload depends on executing the second worker based at least in part on the first worker being in the first worker state; store, at the identified first context switch point, a first memory state of the accelerator device associated with the first worker in the first worker state in a host device memory, wherein the first memory state includes at least a portion of non-transient memory allocations associated with the first worker state; configure, at the identified first context switch point, the memory of the accelerator device to a second memory state associated with the second worker; execute the second worker of the multi-worker workload on the accelerator device using the configured memory during a second time interval; identify a second context switch point at an end of the second time interval at which point the second worker is in a second worker state that is equivalent to the first worker state and the accelerator device is reconfigured to execute the first worker; wherein the stored first memory state matches a second memory state of the accelerator device associated with the second worker in the second worker state in the host device memory at the identified second context switch point; accumulate collective communication operations between the first worker and the second worker during the first and second time intervals; and perform the accumulated collective communication operations at the second context switch point.

Alternatively, or in addition to the other examples described herein, examples include any combination of the following:

further comprising: intercepting, by the processor, instructions associated with the multi-worker workload from a host device, wherein the intercepted instructions include address references associated with a host device address space; translating, by the processor, the address references associated with the host device address space into address references associated with an accelerator device address space; and performing, by the processor, operations associated with the intercepted instructions with the translated address references, wherein the performed operations include executing the first worker and executing the second worker. wherein storing the first memory state of the memory of the accelerator device includes: generating checksums for a plurality of memory data sets of the first memory state, wherein a checksum is generated for each memory data set of the plurality of memory data sets; comparing the generated checksums with checksums of memory data sets stored in the host device memory; determining a subset of generated checksums that do not match checksums of memory data sets stored in the host device memory; and storing a subset of memory data sets of the plurality of memory data sets in the host device memory, wherein the subset of memory data sets includes memory data sets from which the determined subset of generated checksums was generated.

wherein configuring the memory of the accelerator device to a second memory state includes: writing a first subset of memory data sets of a plurality of memory data sets to a first extreme of an address range of the memory of the accelerator device, wherein the first subset of memory data sets includes stable memory data sets that tend to be synchronized across equivalent memory states of the first and second worker; and writing a second subset of memory data sets of the plurality of memory data sets to a second extreme of the address range of the memory of the accelerator device, wherein the second extreme is opposite the first extreme of the address range.

wherein the multi-worker workload is a model training workload and the stable memory data sets include at least one of the following: a parameter data buffer and an optimizer state data buffer.

wherein performing the accumulated collective communication operations at the second context switch point includes: performing accumulated collective communication operations associated with the second worker by the second worker; and preventing accumulated collective communication operations associated with the first worker from being performed by the first worker; and wherein the computerized method further comprises: detecting an operation performed on a stable memory buffer associated with the second worker based at least in part on the performed accumulated collective communication operations; and refraining from performing an operation equivalent to the detected operation on a stable memory buffer associated with the first worker, whereby the stable memory buffer upon which the detected operation was performed is used to reconfigure the accelerator device to execute the first worker after the second context switch point.

wherein the multi-worker workload is a model training workload and storing, at the first context switch point, a first memory state of memory of the accelerator device associated with the first worker in the first worker state in a host device memory includes: identifying data buffers of the first memory state including at least an activation data buffer, a gradient data buffer, an optimizer state data buffer, and a parameter data buffer; storing the optimizer state data buffer and the parameter data buffer in the host device memory, whereby states of the optimizer state data buffer and parameter data buffer are preserved after the first context switch point; and freeing the memory of the activation data buffer and the gradient data buffer, whereby states of the activation data buffer and the gradient data buffer are not preserved after the first context switch point.

further comprising: determining that another accelerator device is available for use with the multi-worker workload; saving a checkpoint state of the multi-worker workload, including saving states of the first worker and the second worker; configuring the memory of the accelerator device to the saved state of the first worker; configuring memory of the other accelerator device to the saved state of the second worker; and executing the multi-worker workload using the accelerator device and the other accelerator device starting at the saved checkpoint state, wherein the first worker is executed on the accelerator device and the second worker is executed on the other accelerator device.

wherein the multi-worker workload is a workload for training a deep learning model.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for executing, by a processor, a first worker of a multi-worker workload on an accelerator device during a first time interval; exemplary means for identifying, by the processor, a first context switch point at an end of the first time interval at which point the first worker is in a first worker state and the accelerator device is reconfigured to execute a second worker; exemplary means for storing, by the processor, at the identified first context switch point, a first memory state of memory of the accelerator device associated with the first worker in the first worker state in a host device memory; exemplary means for configuring, by the processor, the memory of the accelerator device to a second memory state associated with the second worker at the identified first context switch point; exemplary means for executing, by the processor, the second worker of the multi-worker workload on the accelerator device using the configured memory during a second time interval; exemplary means for identifying, by the processor, a second context switch point at an end of the second time interval at which point the second worker is in a second worker state that is equivalent to the first worker state and the accelerator device is reconfigured to execute the first worker; exemplary means for accumulating, by the processor, collective communication operations between the first worker and the second worker during the first and second time intervals; and exemplary means for performing, by the processor, the accumulated collective communication operations at the second context switch point.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a memory comprising computer program code, the memory and the computer program code configured to, with the processor, cause the processor to:

execute a first worker of a multi-worker workload on an accelerator device during a first time interval;

identify a first context switch point at an end of the first time interval at which point the first worker is in a first worker state and the accelerator device is reconfigured to execute a second worker, wherein further execution of the multi-worker workload depends on executing the second worker based at least in part on the first worker being in the first worker state;

store, at the identified first context switch point, a first memory state of the accelerator device associated with the first worker in the first worker state in a host device memory, wherein the first memory state includes at least a portion of non-transient memory allocations associated with the first worker state;

configure, at the identified first context switch point, the memory of the accelerator device to a second memory state associated with the second worker;

execute the second worker of the multi-worker workload on the accelerator device using the configured memory during a second time interval;

identify a second context switch point at an end of the second time interval at which point the second worker is in a second worker state that is equivalent to the first worker state and the accelerator device is reconfigured to execute the first worker, wherein the stored first memory state matches a third memory state of the accelerator device associated with the second worker in the second worker state in the host device memory at the identified second context switch point;

accumulate collective communication operations between the first worker and the second worker during the first and second time intervals; and perform the accumulated collective communication operations at the second context switch point.

2. The system of claim 1, wherein the memory and the computer program code is configured to, with the processor, cause the processor to:

intercept instructions associated with the multi-worker workload from a host device, wherein the intercepted instructions include address references associated with a host device address space;

translate the address references associated with the host device address space into address references associated with an accelerator device address space; and perform operations associated with the intercepted instructions with the translated address references, wherein the performed operations include executing the first worker and executing the second worker.

3. The system of claim 1, wherein storing the first memory state of the memory of the accelerator device includes:

generating a first checksum for a first memory data group of the first memory state and a second checksum for a second memory data group of the first memory state;

comparing the first and second checksums with checksums of memory data groups sets stored in the host device memory;

determining that the first checksum does not match any of the checksums of the memory data groups stored in the host device memory and that the second checksum matches one of the checksums of the memory data groups stored in the host device memory; and based on the determining that the first checksum does not match any of the checksums of the memory data groups stored in the host device memory and that the second checksum matches one of the checksums of the memory data groups stored in the host device memory, storing the first memory data group and not the second memory data group to the host device memory.

4. The system of claim 1, wherein the configuring of the memory of the accelerator device to the second memory state includes:

writing a first memory data group to a first extreme of an address range of the memory of the accelerator device, wherein the first memory data group includes a stable memory data group that tends to be synchronized across equivalent memory states of the first and second workers; and writing a second memory data group to a second extreme of the address range of the memory of the accelerator device, wherein the second extreme is opposite the first extreme of the address range.

5. The system of claim 4, wherein the multi-worker workload is a model training workload and the stable memory data group includes at least one of the following: a parameter data buffer and an optimizer state data buffer, wherein context switching between the first worker and the second worker is performed more than twice during a processing of a same mini-batch, wherein the mini-batch includes an input to be processed by each worker of the multi-worker workload.

6. The system of claim 1, wherein:

the accumulated collective communication operations are performed by the second worker; and the memory and the computer program code is configured to, with the processor, further causes the processor to:

detect a first operation performed on a stable memory buffer associated with the second worker based at least in part on the performed accumulated collective communication operations; and refrain from performing a second operation equivalent to the first operation on an equivalent stable memory buffer associated with the first worker, whereby the stable memory buffer upon which the detected operation was performed is used to reconfigure the accelerator device to execute the first worker after the second context switch point.

7. The system of claim 1, wherein the multi-worker workload is a model training workload and the storing of the first memory state of the accelerator device includes:

identifying data buffers of the first memory state including at least an activation data buffer, a gradient data buffer, an optimizer state data buffer, and a parameter data buffer;

storing the optimizer state data buffer and the parameter data buffer in the host device memory, whereby states of the optimizer state data buffer and parameter data buffer are preserved after the first context switch point; and freeing the memory of the activation data buffer and the gradient data buffer, whereby states of the activation data buffer and the gradient data buffer are not preserved after the first context switch point.

8. A computerized method comprising:

executing a first worker of a multi-worker workload on an accelerator device during a first time interval;

identifying a first context switch point at an end of the first time interval at which point the first worker is in a first worker state and the accelerator device is reconfigured to execute a second worker, wherein further execution of the multi-worker workload depends on executing the second worker based at least in part on the first worker being in the first worker state;

storing at the identified first context switch point, a first memory state of the accelerator device associated with the first worker in the first worker state in a host device memory, wherein the first memory state includes at least a portion of non-transient memory allocations associated with the first worker state;

configuring the memory of the accelerator device to a second memory state associated with the second worker at the identified first context switch point;

executing the second worker of the multi-worker workload on the accelerator device using the configured memory during a second time interval;

identifying a second context switch point at an end of the second time interval at which point the second worker is in a second worker state that is equivalent to the first worker state and the accelerator device is reconfigured to execute the first worker, wherein the first memory state matches a third memory state of the accelerator device associated with the second worker in the second worker state in the host device memory at the identified second context switch point;

accumulating collective communication operations between the first worker and the second worker during the first and second time intervals; and performing the accumulated collective communication operations at the second context switch point.

9. The computerized method of claim 8, further comprising:

intercepting instructions associated with the multi-worker workload from a host device, wherein the intercepted instructions include address references associated with a host device address space;

translating the address references associated with the host device address space into address references associated with an accelerator device address space; and performing operations associated with the intercepted instructions with the translated address references, wherein the performed operations include executing the first worker and executing the second worker.

10. The computerized method of claim 8, wherein storing the first memory state of the memory of the accelerator device includes:

generating a first checksum for a first memory data set of the first memory state and a second checksum for a second memory data set of the first memory state;

comparing the first and second checksums with checksums of memory data sets stored in the host device memory;

determining that the first checksum does not match any of the checksums of the memory data sets stored in the host device memory and that the second checksum matches one of the checksums of the memory data sets stored in the host device memory; and based on the determining that the first checksum does not match any of the checksums of the memory data sets stored in the host device memory and that the second checksum matches one of the checksums of the memory data sets stored in the host device memory, storing the first memory data set and not the second memory data set to the host device memory.

11. The computerized method of claim 8, wherein the configuring of the memory of the accelerator device to the second memory state includes:

writing a first memory data set to a first extreme of an address range of the memory of the accelerator device, wherein the first memory data set includes a stable memory data set that tends to be synchronized across equivalent memory states of the first and second workers; and writing a second memory data set to a second extreme of the address range of the memory of the accelerator device, wherein the second extreme is opposite the first extreme of the address range.

12. The computerized method of claim 11, wherein the multi-worker workload is a model training workload and the stable memory data set includes at least one of the following: a parameter data buffer and an optimizer state data buffer.

13. The computerized method of claim 8, wherein:

the accumulated collective communication operations are performed by the second worker; and the computerized method further comprises:

detecting a first operation performed on a stable memory buffer associated with the second worker based at least in part on the performed accumulated collective communication operations; and refraining from performing a second operation equivalent to the detected first operation on an equivalent stable memory buffer associated with the first worker, whereby the stable memory buffer upon which the detected operation was performed is used to reconfigure the accelerator device to execute the first worker after the second context switch point.

14. The computerized method of claim 8, wherein the multi-worker workload is a model training workload and the storing of the first memory state of the accelerator device includes:

identifying data buffers of the first memory state including at least an activation data buffer, a gradient data buffer, an optimizer state data buffer, and a parameter data buffer;

storing the optimizer state data buffer and the parameter data buffer in the host device memory, whereby states of the optimizer state data buffer and parameter data buffer are preserved after the first context switch point; and freeing the memory of the activation data buffer and the gradient data buffer, whereby states of the activation data buffer and the gradient data buffer are not preserved after the first context switch point.

15. The computerized method of claim 8, further comprising:

determining that another accelerator device is available for use with the multi-worker workload;

saving a checkpoint state of the multi-worker workload, including saving states of the first worker and the second worker;

configuring the memory of the accelerator device to the saved state of the first worker;

configuring memory of the other accelerator device to the saved state of the second worker; and executing the multi-worker workload using the accelerator device and the other accelerator device starting at the saved checkpoint state, wherein the first worker is executed on the accelerator device and the second worker is executed on the other accelerator device.

16. The computerized method of claim 8, wherein the multi-worker workload is a workload for training a deep learning model, wherein context switching between the first worker and the second worker is performed more than twice during a processing of a same mini-batch, wherein the mini-batch includes a set of inputs to be processed by each worker of the multi-worker workload.

17. A computer storage medium having computer-executable instructions that, upon execution by a processor, cause the processor to at least:

execute a first worker of a multi-worker workload on an accelerator device during a first time interval, wherein the multi-worker workload is for training a model;

identify a first context switch point at an end of the first time interval at which point the first worker is in a first worker state and the accelerator device is reconfigured to execute a second worker, wherein further execution of the multi-worker workload depends on executing the second worker based at least in part on the first worker being in the first worker state;

store, at the identified first context switch point, a first memory state of the accelerator device associated with the first worker in the first worker state in a host device memory, wherein the first memory state includes at least a portion of non-transient memory allocations associated with the first worker state;

configure, at the identified first context switch point, the memory of the accelerator device to a second memory state associated with the second worker;

execute the second worker of the multi-worker workload on the accelerator device using the configured memory during a second time interval, wherein the second worker is selected based on a rule that only workers that belong to a same pipeline stage and same tensor-parallel partition are scheduled on a same accelerator device;

identify a second context switch point at an end of the second time interval at which point the second worker is in a second worker state that is equivalent to the first worker state and the accelerator device is reconfigured to execute the first worker, wherein the stored first memory state matches a third memory state of the accelerator device associated with the second worker in the second worker state in the host device memory at the identified second context switch point;

accumulate collective communication operations between the first worker and the second worker during the first and second time intervals; and perform the accumulated collective communication operations at the second context switch point.

18. The computer storage medium of claim 17, wherein the computer-executable instructions, upon execution by a processor, further cause the processor to at least:

intercept instructions associated with the multi-worker workload from a host device, wherein the intercepted instructions include address references associated with a host device address space;

translate the address references associated with the host device address space into address references associated with an accelerator device address space; and perform operations associated with the intercepted instructions with the translated address references, wherein the performed operations include executing the first worker and executing the second worker.

19. The computer storage medium of claim 17, wherein storing the first memory state of the memory of the accelerator device includes:

generating a first checksum for a first memory data set of the first memory state and a second checksum for a second memory data set of the first memory state;

comparing the first and second checksums with checksums of memory data sets stored in the host device memory;

determining that the first checksum does not match any of the checksums of the memory data sets stored in the host device memory and that the second checksum matches one of the checksums of the memory data sets stored in the host device memory; and based on the determining that the first checksum does not match any of the checksums of the memory data sets stored in the host device memory and that the second checksum matches one of the checksums of the memory data sets stored in the host device memory, storing the first memory data set and not the second memory data set to the host device memory.

20. The computer storage medium of claim 17, wherein the configuring of the memory of the accelerator device to the second memory state includes:

writing a first memory data set to a first extreme of an address range of the memory of the accelerator device, wherein the first memory data set includes a stable memory data set that tends to be synchronized across equivalent memory states of the first and second workers; and writing a second memory data set to a second extreme of the address range of the memory of the accelerator device, wherein the second extreme is opposite the first extreme of the address range.

* * * * *